United States Patent
Cong et al.

(10) Patent No.: US 10,691,482 B2
(45) Date of Patent: Jun. 23, 2020

(54) SYSTEMS, METHODS, AND APPARATUS FOR SECURING VIRTUAL MACHINE CONTROL STRUCTURES

(71) Applicant: Intel Corporation, Santa Clara, CA (US)

(72) Inventors: Kai Cong, Hillsboro, OR (US); Karanvir Grewal, Hillsboro, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/108,395

(22) Filed: Aug. 22, 2018

(65) Prior Publication Data

US 2018/0357093 A1    Dec. 13, 2018

Related U.S. Application Data

(63) Continuation-in-part of application No. 15/444,771, filed on Feb. 28, 2017, now Pat. No. 10,303,899.
(Continued)

(51) Int. Cl.
*G06F 9/00* (2006.01)
*G06F 9/455* (2018.01)
*G06F 21/60* (2013.01)
*G06F 12/109* (2016.01)
*G06F 12/14* (2006.01)
(Continued)

(52) U.S. Cl.
CPC ........ *G06F 9/45558* (2013.01); *G06F 12/109* (2013.01); *G06F 12/145* (2013.01); *G06F 12/1408* (2013.01); *G06F 21/53* (2013.01); *G06F 21/602* (2013.01); *G06F 21/6281* (2013.01); *G06F 2009/45583* (2013.01); *G06F 2009/45587* (2013.01);
(Continued)

(58) Field of Classification Search
CPC .... G06F 12/53; G06F 12/602; G06F 12/6281; G06F 12/145; G06F 12/109; G06F 12/1408
See application file for complete search history.

(56) References Cited

U.S. PATENT DOCUMENTS 8,819,455 B2    8/2014  Chhabra et al.
9,213,653 B2   12/2015  Durham et al.
(Continued)

OTHER PUBLICATIONS

"Secure Encrypted Virtualization Key Management", Aug. 2016, 68 pages; Advanced Micro Devices, Inc.
(Continued)

*Primary Examiner* — Beemnet W Dada
(74) *Attorney, Agent, or Firm* — Trop, Pruner & Hu, P.C.

(57) ABSTRACT

A data processing system with technology to secure a VMCS comprises random access memory (RAM) and a processor in communication with the RAM. The processor comprises virtualization technology that enables the processor to (a) execute host software in root mode and (b) execute guest software from the RAM in non-root mode in a virtual machine (VM) that is based at least in part on a virtual machine control data structure (VMCDS) for the VM. The processor also comprises a root security profile to specify access restrictions to be imposed when the host software attempts to read the VMCDS in root mode. Other embodiments are described and claimed.

20 Claims, 10 Drawing Sheets

Related U.S. Application Data

(60) Provisional application No. 62/373,627, filed on Aug. 11, 2016.

(51) Int. Cl.
  G06F 21/62 (2013.01)
  G06F 21/53 (2013.01)

(52) U.S. Cl.
  CPC ............ *G06F 2212/1052* (2013.01); *G06F 2221/2141* (2013.01); *G06F 2221/2149* (2013.01)

(56) References Cited

U.S. PATENT DOCUMENTS

| | | | |
|---|---|---|---|
| 9,335,943 | B2 | 5/2016 | Sahita et al. |
| 9,614,666 | B2 | 4/2017 | Kishinevsky et al. |
| 9,990,249 | B2 | 6/2018 | Durham et al. |
| 2010/0281273 | A1 | 11/2010 | Lee et al. |
| 2011/0302400 | A1 | 12/2011 | Maino et al. |
| 2012/0290850 | A1 | 11/2012 | Brandt et al. |
| 2013/0117577 | A1 | 5/2013 | Hars et al. |
| 2014/0089674 | A1 | 3/2014 | Buehl |
| 2014/0372740 | A1 | 12/2014 | Semenko et al. |
| 2014/0380009 | A1* | 12/2014 | Lemay .............. G06F 12/145 711/163 |
| 2015/0121366 | A1 | 4/2015 | Neiger et al. |
| 2016/0132345 | A1 | 5/2016 | Bacher et al. |
| 2018/0046823 | A1 | 2/2018 | Durham et al. |

OTHER PUBLICATIONS

"Secure Encrypted Virtualization Key Management", Jan. 2017, 92 pages; Advanced Micro Devices, Inc.

"AMD64 Architecture Programmer's Manual", AMD64 Technology, Dec. 2016, vol. 2: System Programming, Cover Page; pp. 207-210; pp. 531-544; Advanced Micro Devices, Inc.

Extended European Search Report dated Mar. 19, 2018 in European Patent Application No. 18152856.3.; European Patent Office.

"Intel® 64 and IA-32 Architectures, Software Developer's Manual, vol. 3 (3A, 3B, 3C & 3D): System Programming Guide"; May 2018; Intel Corporation.

David Mulnix; "Enabling Virtual Machine Control Structure Shadowing on a Nested Virtual Machine With the Intel® Xeon® E5-2600 V3 Product Family"; Dec. 12, 2014.

"4th Generation Intel® Core(TM) vPro(TM) Processors with Intel® VMCS Shadowing"; 2013; Intel Corporation.

"Intel® Architecture Memory Encryption Technologies Specification"; Rev: 1.1; Dec. 2017.

Jun Nakajima; "Making Nested Virtualization Real by Using Hardware Virtualization Features"; May 28, 2013; Intel Corporation.

Orit Wasserman; "Nested virtualization: shadow turtles"; Red Hat; 2013.

Shay Gueron; "A Memory Encryption Engine Suitable for General Purpose Processors"; Intel Corporation; Feb. 25, 2016.

Baiju Patel; "Intel Releases New Technology Specification for Memory Encryption"; Dec. 22, 2017.

"5-Level Paging and 5-Level EPT"; May 2017; Intel Corporation.

European Patent Office, Communication pursuant to Article 94(3) EPC dated Jun. 7, 2019 in European Patent Application No. 18152856.3.

United States Patent and Trademark Office, Notice of Allowance dated Jan. 24, 2019 in U.S. Appl. No. 15/44,771.

Kaplan, "Protecting VM Register State With SEV-ES" Feb. 17, 2017, eight pages, Advanced Micro Devices, Inc.

"AMD Secure Encrypted Virtualization (SEV)," accessed Jun. 15, 2019, four pages, AMD Developer Central, https://developer.amd.com/sev/.

Kaplan, et al., "AMD Memory Encryption" Apr. 21, 2016, 12 pages, Advanced Micro Devices, Inc.

"Secure Memory Encryption (SME)—x86", accessed Jun. 18, 2019, seven pages, WikiChip, https://en.wikichip.org/wiki/x86/sme.

United States Patent and Trademark Office, Non-Final Office Action dated Sep. 18, 2018, in U.S. Appl. No. 15/444,771.

European Patent Office, Invitation Pursuant to Article 94(3) and Rule 71(1) dated Nov. 25, 2019 in EP Patent Application No. 18 152 856.3-1218, 5 pages total.

\* cited by examiner

Root VMCS Security Profile 42

| VMCS Field Type | Permissions | |
| --- | --- | --- |
| | Permission Type | Access Rights |
| Guest-State | Guest-Private | R=0, W=0 |
| Host-State | Host-Private | R=1, W=1 |
| Control | Host-Private | R=1, W=1 |
| VM-Exit Information | Shared | R=1, W=0 |

Non-root VMCS Security Profile 44

| VMCS Field Type | Permissions | |
| --- | --- | --- |
| | Permission Type | Access Rights |
| Guest-State | Guest-Private | R=1 W=1 |
| Host-State | Host-Private | R=0 W=0 |
| Control | Host-Private | R=0 W=0 |
| VM-Exit Information | Shared | R=1 W=1 |
| | | 44R 44W |

SYSTEMS, METHODS, AND APPARATUS FOR SECURING VIRTUAL MACHINE CONTROL STRUCTURES

The present patent application is a continuation-in-part of U.S. patent application Ser. No. 15/444,771, filed on Feb. 28, 2017, entitled "Secure Public Cloud With Protected Guest-Verified Host Control," with inventors David M. Durham et al.; and that patent application claims priority to U.S. provisional patent application Ser. No. 62/373,627, filed on Aug. 11, 2016, entitled "Secure Public Cloud," with inventors David Durham et al.

TECHNICAL FIELD

The present disclosure pertains in general to computer security and in particular to systems, methods, and apparatus for securing virtual machine and their control structures.

BACKGROUND

A data processing system may use virtual machines (VMs) to provide distinct execution environments for distinct software stacks. In particular, a VM provides an execution environment that allows a software stack to execute within that environment as if the software stack were executing within an independent data processing system. The software for managing VMs within a data processing system may be referred to as a hypervisor or a virtual machine monitor (VMM). A data processing system that executes a VMM may be referred to as a host. By contrast, the contents of a VM may be referred to as a guest.

A machine that provides VMs may receive the software stacks for those VMs from other machines at different locations. For instance, a server device that provides VMs may receive a software stack from a remote client device, and the server device may then run that software stack within a VM, on behalf of the client device. An entity that operates such server devices may be referred to as a cloud-service provider (CSP) or VM-service provider (VP). Likewise, an entity that operates such client devices may be referred to as a cloud-service consumer (CSC) or VM-service consumer (VC). Also, a server device that provides VMs to execute software stacks from client devices may be referred to as a cloud server or a VM server, and the corresponding client devices may be referred to as cloud clients or VM clients. In addition, the software stack from a VM client may be referred to as guest software, and the VM within which the guest software is executed may be referred to as the guest VM.

A VM server may use a variety of different data structures to manage VMs. For instance, a VM server may use a virtual machine control structure (VMCS) to store data such as guest operating system (OS) state, host OS state, and various types of control and VM exit information for managing VMs.

The data provided by a VM client to a VM server may be referred to as user data. The data generated within a VM for the client may also be considered user data. A VP may own all resources within a VM server, and a conventional VM server may be able to access all of the user data within any VM in the VM server. However, a VC may not want the VP to have access to all of the user data. For instance, the VC may not want the VP to have access to the guest OS state, since the guest OS state may include sensitive information that should only be seen by the guest software within the guest VM.

BRIEF DESCRIPTION OF THE DRAWINGS

Features and advantages of the present invention will become apparent from the appended claims, the following detailed description of one or more example embodiments, and the corresponding figures, in which:

FIG. 4 is a block diagram of two different example security profiles to be used by the VM server of FIG. 1.

DETAILED DESCRIPTION

Figure 1:
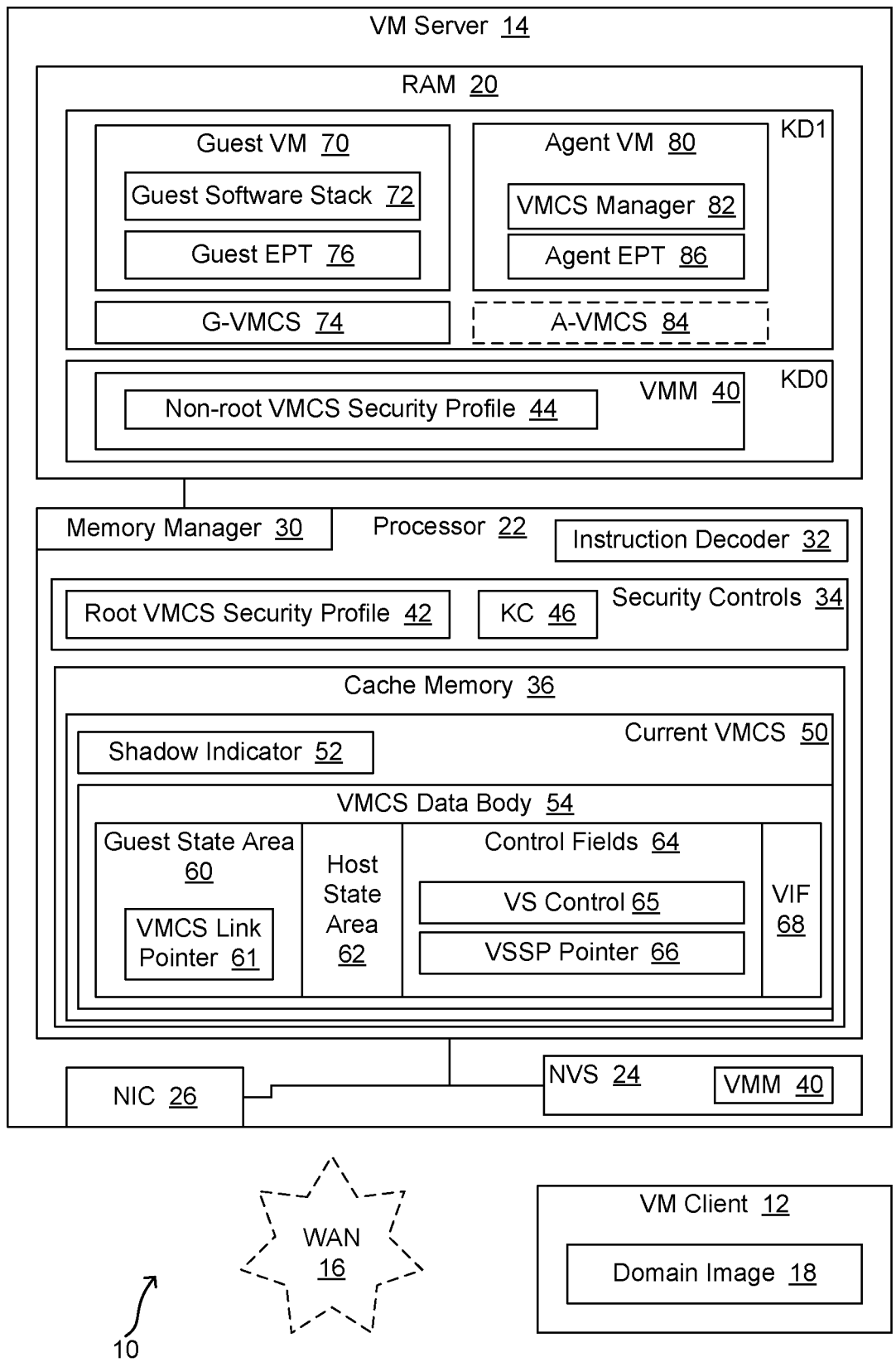
FIG. 1 is a block diagram of an example embodiment of a distributed data processing system with technology for securing a VMCS.

As explained in the September 2016 edition of the Intel® 64 and IA-32 Architectures, Software Developer's Manual, Volume 3C: System Programming Guide, Part 3 (hereinafter, "SDM"), a processor may include technology that supports virtualization of processor hardware for multiple software environments. Such technology may be referred to as virtual-machine extensions (VMX). VMX may support two principal classes of software: VMMs and guest software. According to the SDM, a "VMM acts as a host and has full control of the processor(s) and other platform hardware. A VMM presents guest software . . . with an abstraction of a virtual processor and allows it to execute directly on a logical processor. A VMM is able to retain selective control of processor resources, physical memory, interrupt management, and I/O."

Also, with regard to guest software, the SDM explains as follows: "Each [VM] is a guest software environment that supports a stack consisting of [OS] and application software. Each operates independently of other [VMs] and uses the same interface to processor(s), memory, storage, graphics, and I/O provided by a physical platform. The software stack acts as if it were running on a platform with no VMM."

Also, with regard to VMX operation, root operation, and non-root operation, the SDM explains as follows: "Processor support for virtualization is provided by a form of processor operation called VMX operation. There are two kinds of VMX operation: VMX root operation and VMX non-root operation. In general, a VMM will run in VMX root operation and guest software will run in VMX non-root operation. Transitions between VMX root operation and VMX non-root operation are called VMX transitions. There are two kinds of VMX transitions. Transitions into VMX non-root operation are called VM entries. Transitions from VMX non-root operation to VMX root operation are called VM exits." For purposes of this disclosure, VMX root operation may also be referred to as root mode, and VMX non-root operation may be referred to as non-root mode.

The SDM also explains that processor behavior in root mode "is very much as it is outside VMX operation. The principal differences are that a set of new instructions (the VMX instructions) is available and that the values that can be loaded into certain control registers are limited."

With regard to the overall life cycle of VMM software and individual VMs, the SDM explains as follows: The VMM "enters VMX operation by executing a VMXON instruction." The VMM can then use "VM entries" to "enter guests into [VMs] (one at a time). The VMM effects a VM entry using instructions VMLAUNCH and VMRESUME; it regains control using VM exits. VM exits transfer control to an entry point specified by the VMM. The VMM can take action appropriate to the cause of the VM exit and can then return to the [VM] using a VM entry. Eventually, the VMM may decide to shut itself down and leave VMX operation. It does so by executing the VMXOFF instruction."

With regard to the VMCS, the SDM explains that "VMX non-root operation and VMX transitions are controlled by a data structure called a [VMCS]," and that access to the VMCS is "managed through a component of processor state called the VMCS pointer (one per logical processor)." Additionally, the "value of the VMCS pointer is the 64-bit address of the VMCS," and the VMCS pointer is "read and written using the instructions VMPTRST and VMPTRLD," respectively. In particular, the VMM only allows one VMCS to be "current" at a time on a logical processor, and the VMM uses VMPTRLD to set the VMCS at the specified address as the current VMCS on the logical processor. The VMM may then configure the current VMCS using the VMREAD, VMWRITE, and VMCLEAR instructions. Thus, the VMM may use VMPTRLD to enable editing of the current VMCS. In one embodiment, the VMCS is opaque to the VMM, in that the processor and/or the memory controller do not allow the VMM to directly read or write the VMCS using memory read or write instructions. Instead, the VMM can only access fields of the VMCS by using VM instructions such as VMREAD and VMWRITE. Consequently, additional security fields could be added to future versions of the VMCS without impacting legacy compatibility. In addition, the SDM explains that a VMM "could use a different VMCS for each [VM] that it supports. For a [VM] with multiple logical processors (virtual processors), the VMM could use a different VMCS for each virtual processor."

Thus, a VMM in a conventional VM server modifies data structures that pertain to the execution state of a VM when the VM server switches into or out of the VM (i.e., when the VM server enters or exits the VM). These data structures include VMCSs and memory mappings such as page tables and extended page tables (EPTs). Each VM has its own set of one or more VMCSs, with one VMCS for each virtual processor. In other words, the VMM maintains a different set of VMCSs for each guest VM. Each VMCS includes a guest state area (GSA), a host state area (HSA), and other fields or areas. With every change of the execution context into a VM (i.e., when the VM server enters the VM), the VMM uses the GSA of the VMCS for that VM to restore the state of that VM's virtual processor. When the execution context switches from the guest VM back to the host VMM (i.e., when the VM server exits the VM), the VMM uses the HSA of the same VMCS to restore the host's processor state.

Also, the OS for a guest VM will form its own memory mappings between guest virtual addresses (GVAs) and guest physical addresses (GPAs) using its own page tables. The VMM then uses EPTs to map GPAs to the host physical addresses (HPAs) used by hardware to access physical memory.

Accordingly, as indicated above, when a conventional VM server hosts a guest VM for a VC, the VMM in the VM server may be able to access all of the user data for that guest VM. However, the VC may not want the VMM to have access to all of that user data. For instance, the VC may not want the VMM to have access to the guest OS state in a VMCS for that guest VM.

A VM server may provide for memory encryption or other types of memory protection which prevent the VMM in the VM server from accessing guest data that is stored in random access memory (RAM) of the VM server. For instance, technology for protecting guest data in RAM is described in the following documents: (a) U.S. patent application publication no. 2008/0046823, entitled "Secure Public Cloud," with inventors David M. Durham et al. and a filing date of Oct. 14, 2016; and (b) U.S. patent application Ser. No. 15/444,771, entitled "Secure Public Cloud With Protected Guest-Verified Host Control," with inventors David M. Durham et al. and a filing date of Feb. 28, 2017. Those two documents may be referred to as "the Secure Public Cloud (SPC) applications."

As explained in the SPC applications, a VM server may use key domains to prevent a VMM in the VM server from accessing guest VM data. A key domain (KD) for a guest VM provides for a protected region of memory that the guest VM can access, while the region is inaccessible to other guest VMs and the host VMM. The data in a KD may be encrypted with a consumer-provided or hardware-generated key domain key (KDK). The KD for a guest VM may include the software stack for that guest VM, as well as data structures such as the VMCS and the memory mappings for the guest VM. The data in the KD is encrypted with the KDK. Consequently, the host VMM and other guest VMs which do not possess the KDK for that KD have no access to read or modify the data in the KD, including the control structures in the KD such as the VMCS. The VMM might be able to read encrypted data from the KD, but the VMM cannot decrypt that data correctly, because the VMM does not have access to the KDK. For purposes of this disclosure, unless the context suggests otherwise, if a component has access to encrypted data but no ability to decrypt that data, the component may be referred to as not having access to that data.

However, as explained in the SPC applications, when a VMM uses VMPTRLD to make a particular VMCS current, the memory manager uses the KDK for the KD within which that VMCS resides to decrypt that VMCS, and the memory manager loads the decrypted VMCS into cache memory. However, to access that decrypted VMCS, the VMM must use VMREAD or VMWRITE, and any such VMREAD and VMWRITE operations will be governed by hardware-based security controls, such as the root VMCS security profile described below.

In addition, VM server may use an agent VM to read and write the control structures for a guest VM. For instance, the VMM may launch an agent VM to operate in the same KD as the guest VM, and the agent VM may read and write to control structures such as the VMCS, on behalf of the VMM. However, in at least one embodiment, that agent VM is provided by the VC, and the VC can therefore be confident that the agent VM is trustworthy and will not allow the VMM to make any unauthorized data modifications.

A VM server may use any suitable technology or combination of technologies to provide for protected memory regions for VMs. Those technologies may include, without limitation, technologies provided by Intel Corporation under any of the following trademarks or tradenames: Intel® Virtualization Technology (VT), Intel® Trusted Execution Technology (TXT), Intel® Memory Encryption Engine (MEE), Intel® Multiple Key Total Memory Encryption (MKTME), and Intel® MKTME with Integrity (MKTMEi).

In one embodiment, a VM server includes a processor in communication with a memory manager that includes an encryption engine, and the VM server uses the encryption engine to implement a different KD for each guest VM and another KD for the VMM. The encryption engine may use technologies like those provided under the trademark or tradename of Intel® MKTME or Intel® MKTMEi, for instance.

In one embodiment, the processor automatically switches from one KD to another whenever the processor switches from root mode to non-root mode and whenever the processor switches from non-root mode to root mode. In particular, the processor automatically switches KDs when the processor executes instructions which cause a VM entry and instructions which cause a VM exit. Thus, instructions that cause a VM entry also cause the processor to automatically switch out of the KD of the VMM and into the KD of the guest VM that is being entered, while instructions that cause a VM exit also cause the processor to automatically switch out of the KD of the guest VM that is being exited and into the KD of the VMM. Thus, VM entries and VM exits cause the processor to switch KDs. Nevertheless, the processor runs in the KD of a guest VM whenever the guest VM is running, and the processor runs outside the KD of the guest VM whenever the VMM is running.

In particular, as explained in the SPC applications, the "result of switching from one key domain to another . . . is that control over a particular physical memory alias is passed to a VM . . . that is authorized to access the current key domain . . . . Different hardware key domains accessed via key domain keys prevent information leaks of consumer private data across VMs and even by an adversary with access to the external physical memory manager . . . . A key domain identifier/selector (e.g., part of the physical address) keeps VM memory regions separate in cache. In one embodiment, instead of a switch key domain instruction, the VMX root [VMLAUNCH/VMRESUME] instructions will switch the key domain to the key domain containing the VMCS as identified by the key domain identifier in the address provided by the [VMPTRLD] instruction, which loads the pointer to the current VMCS from the address specified in the [VMPTRLD] instruction. A [VM exit] will then switch back to the VMX root key domain or shared memory region."

In one embodiment, the encryption engine associates a different key identifier (KeyID) with each KDK. For instance, in a scenario involving a VMM that runs in a first KD with a first KDK and a VM that runs in a second KD with a second KDK, the KDK for the VMM has one KeyID, and the KDK for the VM has another KeyID. Accordingly, a KD many also be referred to as a KeyID domain. Also, instructions such as VMLAUNCH and VMRESUME cause VM entry into the VM for the current VMCS. And the VMM makes a VMCS current by identifying that VMCS as part of a VMPTRLD instruction, before executing the VMLAUNCH or VMRESUME instruction. In addition, the VMM specifies the KeyID for that VM in the VMPTRLD instruction. In particular, the VMM specifies that KeyID as part of the input physical address parameter of the VMPTRLD instruction. Consequently, in response to the VMM executing that VMPTRLD instruction, the processor will use the specified KeyID in the physical memory address when loading the VMCS. Consequently, the encryption engine automatically uses the corresponding KDK when loading the VMCS. And after the VMM then executes VMLAUNCH or VMRESUME, the processor will use the specified KeyID in the physical memory address when the VM accesses memory. Consequently, the encryption engine automatically uses the corresponding KDK when processing the memory access requests from the VM. Thus, the processor automatically switches into the KD for that VM.

Similarly, instructions which cause VM exits also cause the processor to use the VMM's KeyID (or the shared KeyID) in the physical addresses of the subsequent memory access requests, thereby causing the encryption engine to automatically switch back to the VMM's KD. For instance, an event that causes a VM exit may cause the processor to change the KeyID to the VMM's KeyID and then resume root operation according to the host fields in the current VMCS. In one embodiment, the VMM's KeyID is determined a priori as a reserved KeyID and KDK that cannot be assigned to any secure VM, and the processor sets that KeyID when transitioning into root mode. Additional information on memory encryption, KeyIDs, KeyID domains, etc. may be found (a) in the December 2017 edition of the Intel® Architecture Memory Encryption Technologies Specification (hereinafter "MET specification") and (b) in the SPC applications, which refer to a KeyID as a key domain identifier (KD_Id) or a key domain address selector. For instance, the processor page walk handler or page miss handler (PMH) may set KeyIDs in the address translations for tagged translation lookaside buffer (TLB) entries, where the HPAs are prepended or appended with the associated KeyID values.

Since the processor automatically switches between KDs on VM entry and VM exit, the VM server may run in the KD of the guest VM only when the guest VM is running, and not when the VMM is running. In various embodiments, the VMM may run in a different KD, in a shared memory region, or in no KD at all. Also, if multiple guests are running concurrently, there may be multiple KDs active in the MKTME at any one time, with each of those KDs associated with one of those guests.

In one embodiment, the encryption engine includes an encryptor and a decryptor. The encryptor encrypts all of the data for the guest VM before storing that data in RAM. The decryptor decrypts that data when the memory manager reads the data into the processor cache from RAM, provided that the processor is running in the KD of the guest VM when the data is read into the processor cache.

The data in the KD for the guest VM may include the software stack for the guest VM, as well as related data, such as a VMCS for the guest VM. However, in order to manage guest VMs, the VMM in a conventional VM server needs to access data in the VMCSs for those guest VMs. The above patent applications describe an agent VM that runs in the same KD as a guest VM, and that agent VM includes control logic for performing operations on the VMCS of the guest VM, on behalf of the VMM.

The present disclosure describes technology for securing VMCSs in VM servers that use agent VMs to access VMCSs for guest VMs. For instance, the present disclosure describes technology for preventing an agent VM from accessing one or more particular portions of a VMCS, while preventing the host VMM from accessing other portions of the VMCS.

FIG. 1 is a block diagram of an example embodiment of a distributed data processing system 10 with technology for securing a VMCS. In the illustrated embodiment, distributed data processing system 10 includes a VM client 12 that communicates with a VM server 14 over a wide area network (WAN) 16 such as the Internet. A CSP or VP may use a data processing system such as VM server 14 to provide VMs to execute software stacks from CSCs or VCs. Accordingly, a VC may use a data processing system such as VM client 12 to send a software stack (and related information) to VM server 14 for execution in a VM. Accordingly, VM client 12 includes a domain image 18 which VM client 12 sends to VM server 14 via WAN 16 to enable VM server 14 to execute a software stack on behalf of VM client 12.

FIG. 1 depicts VM server 14 as including a processor 22 in communication with RAM 20, nonvolatile storage (NVS) 24, and a network interface controller (NIC) 26. Also, processor 22 includes a memory manager 30, an instruction decoder 32, security controls 34, and cache memory 36. In other embodiments, VM servers may use processors with multiple cores, and each core may support multiple threads, each of which executes on a single logical processor. However, for ease of understanding, the embodiment of FIG. 1 presents a relatively simple hardware environment. Similarly, a VM server may include many additional hardware components, including additional components within the processor; however, for ease of understanding, such components are not depicted in FIG. 1. VM client 12 may also include any suitable hardware components, such as a processor, RAM, a NIC, etc.

NVS 24 in VM server 14 may include software such as a VMM 40 that VM server 14 copies into RAM 20 and executes on processor 22 to provide guest VMs for VCs. Additionally, VM server 14 is configured to provide memory protection for guest VMs and agent VMs. For instance, as described in greater detail below, VMM 40 may run in one KD, while each guest VM may run in a different KD. In another embodiment or scenario, the VMM may run in a shared, unprotected memory region. In the embodiment of FIG. 1, VM server 14 has been configured to run VMM 40 in a KD that is depicted as KD0, and to run guest VM 70 in another KD that is depicted as KD1. As described in greater detail below, VM server 14 is also configured to run a VM agent 80 in KD1. For instance, when VM server 14 receives domain image 18, VMM 40 may load guest software stack 72 into guest VM 70 in KD1, and VMM 40 may load VMCS manager 82 into agent VM 80 in KD1.

Domain image 18 may also include a different VMCS for each VM, and VMM 40 may load those VMCSs into KD1. VMM 40 may also load a different EPT into each VM, such as a guest EPT 76 in guest VM 70 and an agent EPT 86 in agent VM 80. And as indicated above, in other scenarios, a VM with multiple virtual processors may have a different VMCS for each virtual processor. However, in such a scenario, the VMs may use the same EPT for all virtual processors, with each VMCS for the VM having the same address in its EPT pointer (EPTP) field.

Figure 2:
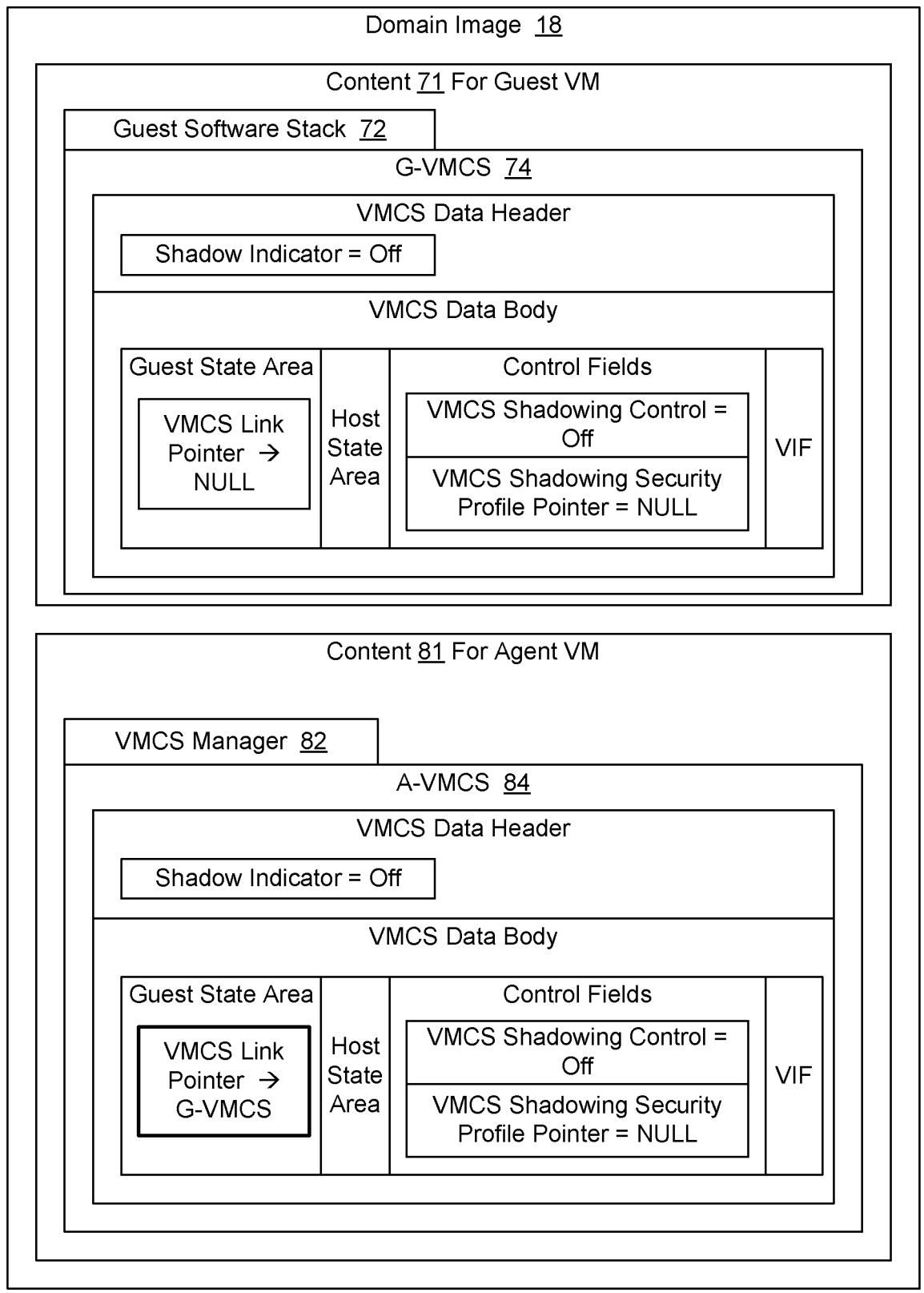
FIG. 2 is a block diagram of an example embodiment of a domain image to be used by the VM server of FIG. 1 to execute software for the VM client of FIG. 1.

FIG. 2 is a block diagram of an example embodiment of domain image 18 to be used by VM server 14 to execute software for VM client 12. As illustrated, domain image 18 includes content 71 for a guest VM and content 81 for an agent VM. Content 71 includes a guest software stack 72 to be executed in a guest VM in VM server 14, such as guest VM 70. Content 71 also includes the VMCS for that guest VM. That VMCS may be referred to as Guest VMCS (G-VMCS) 74.

Content 81 includes VMCS manager 82, which is to be executed in an agent VM in VM server 14, such as agent VM 80. VMCS manager 82 may also be referred to as an agent software stack. VMM 40 may load VMCS manager 82 into agent VM 80 in KD1, and when VMCS manager 82 executes in agent VM 80, VMCS manager 82 may update one or more VMCSs on behalf of VMM 40, as described in greater detail below.

Content 81 also includes the VMCS for that agent VM. That VMCS may be referred to as Agent VMCS (A-VMCS) 84.

Referring again to FIG. 1, in response to receiving domain image 18 from VM client 12, VM server 14 may use guest software stack 72 to create guest VM 70, and VM server 14 may use VMCS manager 82 to create agent VM 80. In particular, VM server 14 may create VMs 70 and 80 in KD1. VM server 14 may also load G-VMCS 74 and A-VMCS 84 into KD1.

Also, as indicated above, the architecture of processor 22 includes security controls 34. As described in greater detail below, security controls 34 include one or more data structures that contain permission settings for controlling access to VMCSs and fields within the VMCSs. Such permission settings may specify access rights, and the permission settings may reside in data structures referred to herein as VMCS security profiles. In particular, in the embodiment of FIG. 1, security controls 34 includes a root VMCS security profile (VSP) 42 to control access to various VMCS fields when that VMCS is accessed in root mode. As described in greater detail below, security controls 34 also include a KeyID controller (KC) 46.

In addition, VMM 40 includes a non-root VSP 44 to control access to various fields in a VMCS when that VMCS is accessed in non-root mode. In particular, as described in greater detail below, processor 22 supports VMCS shadowing, which allows a so-called "shadow VMCS" to be accessed in non-root mode, and processor 22 uses non-root VSP 44 to control access to the shadow VMCS. However, if processor 22 is executing in non-root mode and shadowing is not turned on, processor 22 does not allow read or write access to the VMCS. Instead, if a VM attempts a VMREAD or VMWRITE operation when shadowing is not turned on, processor 22 may perform a VM exit instead of the VMREAD or VMWRITE.

Figure 3:
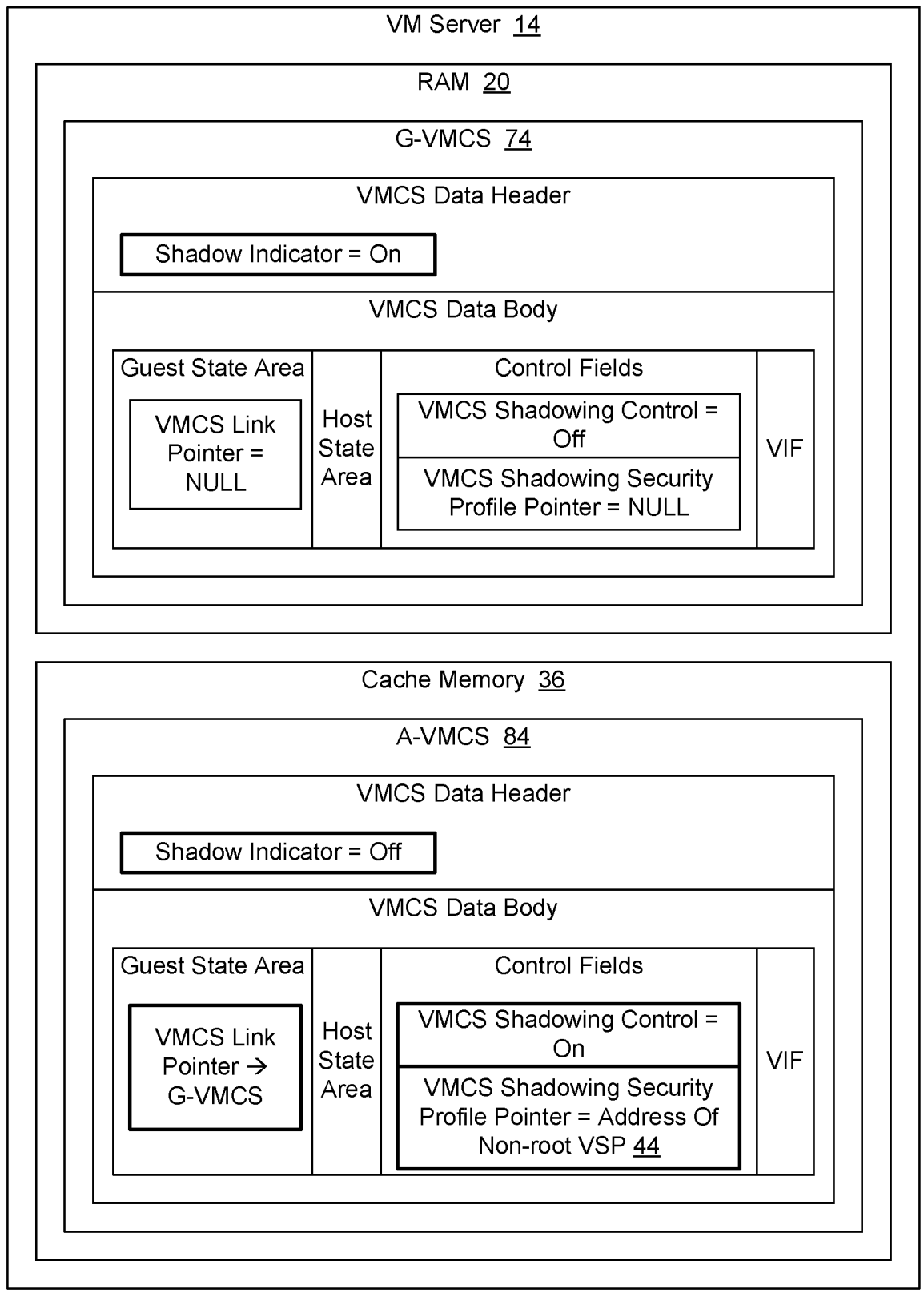
FIG. 3 is a block diagram depicting a current VMCS and a shadow VMCS configured for utilization by an agent VM.

As described in greater detail below, when VM server 14 is about to enter a VM, VMM 40 loads a VMCS for that VM into cache memory 36. Such a VMCS is depicted in FIG. 1 as current VMCS 50. VMCS 50 includes various different areas and fields, such as a shadow indicator 52, a guest state area (GSA) 60, a host state area (HSA) 62, control fields 64, and VM-exit information fields (VIF) 68. In one embodiment, VMCS 50 includes a header portion that contains a shadow indicator 52 and a body portion that contains GSA 60, HSA 62, control fields 64, and VIF 68. As illustrated in FIG. 3, the header portion of a VMCS may be referred to as a VMCS data header, and the body portion may be referred to as a VMCS data body 54. In one embodiment, VMCS data body 54 corresponds to the area described in Section 24.2 of the SDM as "VMCS data." Also, control fields 64 includes the fields described collectively in the SDM as VMX controls, which includes VM-execution control fields, VM-exit control fields, and VM-entry control fields. However, other embodiments may organize the various areas and fields of the VMCS differently, and other embodiments may use different labels, formats, and such for the different areas and fields.

In the embodiment of FIG. 1, GSA 60 include a VMCS link pointer 61. Also, control fields 64 include a VMCS shadowing (VS) control 65 and a VMCS shadowing security profile (VSSP) pointer 66. In one embodiment, VS control 65 corresponds to the field referenced in the SDM as the "VMCS shadowing" control. Accordingly, as explained in the SDM, if "this control is 1, executions of VMREAD and VMWRITE in VMX non-root operation may access a shadow VMCS (instead of causing VM exits)."

Also, VSSP pointer 66 corresponds to the fields referenced in the SDM as the "VMCS Shadowing Bitmap Addresses." Accordingly, as explained in the SDM:

These fields are to contain the "64-bit physical addresses of the VMREAD bitmap and the VMWRITE bitmap. Each bitmap is 4 KBytes in size and thus contains 32 KBits. The addresses are the VMREAD-bitmap address and the VMWRITE-bitmap address."

"If the 'VMCS shadowing' VM-execution control is 1, executions of VMREAD and VMWRITE may consult these bitmaps."

In other words, VSSP pointer 66 points to a security profile to be used when VS control 65 is set to On (or 1) (i.e., when shadowing is turned on).

Also, as indicated above, VM server 14 includes root VSP 42 and non-root VSP 44. When VMM 40 is executing, processor 22 will be in root mode, and so processor will use root VSP 42 to enforce access rights whenever VMM 40 tries to access fields in the body of the current VMCS using VMREAD or VMWRITE. When a VM is executing, however, processor 22 will be in non-root mode. Accordingly, as described in greater detail below, when (a) agent VM 80 is executing, (b) VS control 65 is set to On, and (c) VSSP pointer 66 contains the address of non-root VSP 44, processor 22 uses non-root VSP 44 to enforce access rights whenever agent VM 80 accesses fields in the body of the shadow VMCS using VMREAD or VMWRITE.

However, as indicated above, shadow indicator 52 is not part of VMCS data body 54. And as described below, processor 22 uses special rules to govern access to shadow indicator 52.

For ease of understanding, FIG. 1 depicts a single VSSP pointer 66. However, in different embodiments, any particular security profile may be implemented as a unitary structure or as a combination of structures. For instance, a security profile may be divided on the basis of the access type being controlled (e.g., read or write). Accordingly, a security profile may have multiple parts, and a VMCS may include a pointer to each of those parts. For instance, the address for a security profile for reads (e.g., a VMREAD-bitmap address) may be loaded into one pointer, and the address of a security profile for writes (e.g., a VMWRITE-bitmap address) may be loaded into another pointer.

Referring again to FIG. 2, as illustrated, VM client 12 has configured G-VMCS 74 with settings such as a shadow indicator setting of Off and a VMCS link pointer of NULL. VM client 12 has also configured A-VMCS 84 with a shadow indicator setting of Off. However, as described in greater detail below, VMM 40 may change that setting later. Also, VM client 12 has configured the VMCS link pointer in A-VMCS 84 with an address for another VMCS. In particular, VM client 12 has determined the host physical address that will be used for G-VMCS 74 when VMM 40 creates guest VM 70, and VM client 12 has loaded that address into the VMCS link pointer of A-VMCS 84. Consequently, as described in greater detail below, when agent VM 80 executes, processor 22 may use A-VMCS 84 as a current VMCS and G-VMCS 74 as a shadow VMCS. Consequently, when VMCS manager 82 executes instructions such as VMREAD and VMWRITE, processor 22 may access the shadow VMCS (i.e., G-VMCS 74) instead of the current VMCS (i.e., A-VMCS 84).

Thus, VMCS manager 82 in agent VM 80 may use VMREAD and VMWRITE to access G-VMCS 74 in KD1, subject to non-root VSP 44. In particular, as described in greater detail below with regard to FIGS. 5 and 6A through 6D, agent VM 80 accesses G-VMCS 74 indirectly (as a shadow VMCS) when A-VMCS 84 is the current VMCS and shadowing is turned on. VMCS manager 82 in agent VM 80 then sets the Shadow Indicator to Off in G-VMCS 74, thereby allowing VMM 40 to make G-VMCS 74 the ordinary (non-shadow) current VMCS, when VMM 40 launches or resumes guest VM 70. Agent VM 80 then exits, and that VM exit causes a context switch to root mode and a switch from KD1 to KD0, but A-VMCS 84 remains the current VMCS. VMM 40 may then use VMPTRLD to make G-VMCS 74 the current VMCS. To verify any changes made to G-VMCS 74, VMM 40 may then use VMREAD to access G-VMCS 74 in KD0, subject to root VSP 42.

Additional information on how conventional VMCS shadowing works may be found in the SDM. Additional details on how VM server 14 provides security for ordinary (non-shadow) VMCSs and for shadow VMCSs are provided above and below. For instance, referring again to FIG. 1, when A-VMCS 84 is the current VMCS (depicted in FIG. 1 as current VMCS 50) and G-VMCS 74 is the shadow VMCS of A-VMCS 84, agent VM 80 has the ability to turn shadow indicator 52 to Off in G-VMCS 74. And VMM 40 has the ability to turn shadow indicator 52 to On in G-VMCS 74 when G-VMCS 74 is the current VMCS, as described in greater detail below with regard to FIGS. 6A through 6D. As also described below, if edits are needed to G-VMCS 74, VMM 40 can turn the shadow indicator On to make G-VMCS 74 the shadow of A-VMCS 84, and VMM 40 can then launch agent VM 80, with a request for further modifications.

In one embodiment or scenario, VMM 40 may use VMREAD and VMWRITE to access some fields on G-VMCS 74 in KD0, subject to root VSP 42. Alternatively, VMM 40 may use VMREAD to read from G-VMCS 74 in KD0, subject to root VSP 42, and VMM 40 may use agent VM 80 to write to G-VMCS 74 in KD1, subject to non-root VSP 44.

As part of an initialization process, VM server 14 may provide VM client 12 with configuration data that indicates where in host physical memory VMM 40 will load guest software stack 72 in VM 70 and where G-VMCS 74 will reside. VM client 12 may then load the planned address for G-VMCS 74 into the VMCS link pointer of A-VMCS 84. In addition or alternatively, VM client 12 may decide where G-VMCS 74 should reside, and VM client 12 may send configuration data with that address to VM server 14. In addition, VM client may use its KDK to encrypt domain image 18 before sending domain image 18 to VM server 14. However, VM client 12 may send the configuration data with the intended address for G-VMCS 74 to VM server as plaintext, or encrypted in a manner that can be decrypted by VM server outside of KD1. VM client 12 may be operated by the owner of guest software stack 72, or by a trusted third party. Thus, the initial guest image code and data may be preconfigured by the consumer or a trusted third party, and securely installed into memory of VM server 14.

FIG. 3 is a block diagram depicting a current VMCS and a shadow VMCS configured for utilization by agent VM 80. In particular, FIG. 3 depicts A-VMCS 84 as the current VMCS and G-VMCS 74 as the shadow VMCS. Accordingly, as described in greater detail below with regard to FIGS. 6A-6D, A-VMCS 84 has been decrypted and loaded into cache memory 36, while G-VMCS 74 is residing in RAM 20. However, since agent VM 80 runs in KD1, the KD1 encryption does not prevent agent VM 80 from accessing G-VMCS 74 as a shadow VMCS.

FIG. 3 illustrates that the current VMCS (i.e., A-VMCS 84) has been configured as follows: (a) the shadow indicator is set to Off (or 0), (b) the VMCS link pointer points to G-VMCS 74, (c) the VMCS shadowing control is set to On, and (d) the VMCS shadowing security profile pointer points to non-root VSP 44. In addition, FIG. 3 illustrates that the shadow VMCS (i.e., G-VMCS 74) has been configured with its shadow indicator set to On.

When two VMCSs are configured as illustrated in FIG. 3, processor 22 operates instructions such as VMREAD and VMWRITE on the shadow VMCS (e.g., G-VMCS 74) instead of the current VMCS (e.g., A-VMCS 84). In general, for purposes of this disclosure, references to a "shadow VMCS" pertain to a VMCS with its shadow indicator set to On, while a current VMCS has its VMCS shadowing control set to On and its VMCS link pointer pointing to the first VMCS (i.e., pointing to the VMCS that has its shadow indicator set to On).

FIG. 4 is a block diagram of two different example security profiles to be used by the VM server 14. In particular, FIG. 4 provides details for root VSP 42 and non-root VSP 44. As indicated above, processor 22 uses root VSP 42 to control access to VMCSs when processor 22 is in root mode (e.g., when VMM 40 is executing), and processor 22 uses non-root VSP 44 to control access to VMCSs when processor 22 is in non-root mode with shadowing on (e.g., when agent VM 80 is executing with G-VMCS 72 as a shadow VMCS).

As illustrated, root VSP 42 provides for four different field types and for three different permission types, depending on the field type. The field type may be based on the "field type" field of the VMCS component encoding, for instance. Section 24.11.2 of the SDM states that every field of the VMCS "is associated with a 32-bit value that is its encoding. The encoding is provided in an operand to VMREAD and VMWRITE when software wishes to read or write that field." And in particular, with regard to "field type," the SDM goes on to state that bits 11:10 of the VMCS component encoding "encode the type of VMCS field: control, guest-state, host-state, or VM-exit information. (The last category also includes the VM-instruction error field.)" Accordingly, root VSP 42 provides for the following four field types: Guest-state, Host-state, Control, and VM-exit information. In particular, referring again to FIG. 1, processor 22 may attribute the following field types to the following fields:

Field type of Guest-state: All fields in Guest State Area 60.
Field type of Host-state: All fields in Host State Area 62.
Field type of Control: All fields in Control Fields 64.
Field type of VM-exit information: All fields in VIF 68.

As further illustrated in FIG. 4, root VSP 42 specifies three different permission types:

Guest-private,
Host-private, and
Shared.

Root VSP 42 also associates one of those permission types with each of the field types. In particular, root VSP 42 specifies that Guest-state fields are to have Guest-private permissions, Host-state fields and Control fields are to have Host-private permissions, and VM-exit fields are to have Shared permissions. As indicated above, a leading capital letter (e.g., Shared) may be used herein to denote permission types and field types. In another embodiment, the root VSP is extended to include additional field types, and to associate a permission type with each of those field types. For instance, in one embodiment, the root VSP also provides one or more "EPT field types" for EPT data structures in the VMCS, one or more "MSR field types" for model-specific registers (MSRs) in the VMCS, etc. The root VSP may also associate a permission type with each of those field types.

Root VSP 42 also specifies or defines a particular set of access privileges or access rights for each permission type. In the embodiment of FIG. 4, root VSP 42 indicates that the access rights for any Guest-private field are to be as follows: read disallowed (R=0) and write disallowed (W=0). And as illustrated, any Host-private field is to be read allowed (R=1) and write allowed (W=1), and any Shared field is to be R=1, W=0.

In the embodiment of FIG. 4, non-root VSP 44 is similar to root VSP 42, using the same categories for field type and permission type. And in another embodiment, the non-root VSP is extended to include additional field types, and to associate a permission type with each of those field types. For instance, in one embodiment, the non-root VSP also provides one or more EPT field types for EPT data structures in the VMCS, one or more MSR field types for MSRs in the VMCS, etc. The root VSP may also associate a permission type with each of those field types. However, in the embodiment of FIG. 4, non-root VSP 44 defines different access rights for at least one of the field types, compared to root VSP 42. In particular, in the embodiment of FIG. 4, non-root VSP 44 defines different access rights for all four of the field types, compared to root VSP 42. Specifically, non-root VSP 44 defines the following access rights: field type Guest-private is R=1, W=1; field type Host-private is R=0, W=0; and field type Shared is R=1, W=1.

Also, a security profile may be implemented as a single data structure in one embodiment, but as multiple data structures in another embodiment. For instance, a security profile may be split into two or more units, with each unit having a different address. For instance, as shown with dashed boxed in non-root VSP 44 in FIG. 4, security profile non-root VSP 44 may actually be implemented as two security profiles, such as a read-profile 44R for VMREADs and a write-profile 44W for VMWRITEs. Accordingly, instead of a single VSSP pointer 66, a VM server may have one VSSP pointer for the address of a read-profile (e.g., a VMREAD bitmap) and another VSSP pointer for the address of a write-profile (e.g., a VMWRITE bitmap).

As indicated above, processor 22 generally uses root VSP 42 to enforce VMCS access rights in root mode and non-root VSP 44 to enforce VMCS access rights in non-root mode. However, in at least one embodiment, processor 22 uses special rules to govern access to the shadow indicator. In such an embodiment, processor 22 does not associate the shadow indicator with any of the four field types referenced above, and processor 22 does not use root VSP 42 or non-root VSP 44 to determine access rights to the shadow indicator. Instead, processor 22 treats the shadow indicator as a special case. In particular, for VMWRITEs, software in root mode (e.g., VMM 40) is only allowed to write 1 to the shadow indicator (i.e., to enable the current VMCS to operate as a shadow VMCS), and software in non-root mode (e.g., VMCS manager 82 in agent VM 80) is only allowed to write 0 to the shadow indicator (i.e., to disable a VMCS from operating as a shadow VMCS). Also, processor 22 may allow VMREADs of the shadow indicator for software in root mode and for software in non-root mode. Processor 22 may provide any suitable mechanism or mechanisms to facilitate the behaviors described above. For instance, processor 22 may provide for a specific predetermined encoding to be used to direct VMWRITEs and VMREADS to the shadow indicator, and that encoding may be based on one of the existing encoding fields or a new field (e.g., using some reserved bits from the 32-bit encoding). Alternatively, processor 22 may provide a particular instruction (e.g., VMCS-Shadow-Indicator-WRITE or VSIWRITE) to be used to write to the shadow indicator, along with a corresponding instruction (e.g., VSIREAD) to be used to read the shadow indicator. However, as indicated above, software in root mode is only allowed to write 1 to the shadow indicator of the current VMCS, and software in non-root mode is only allowed to write 0 to the shadow indicator of the corresponding shadow VMCS.

Figure 5:
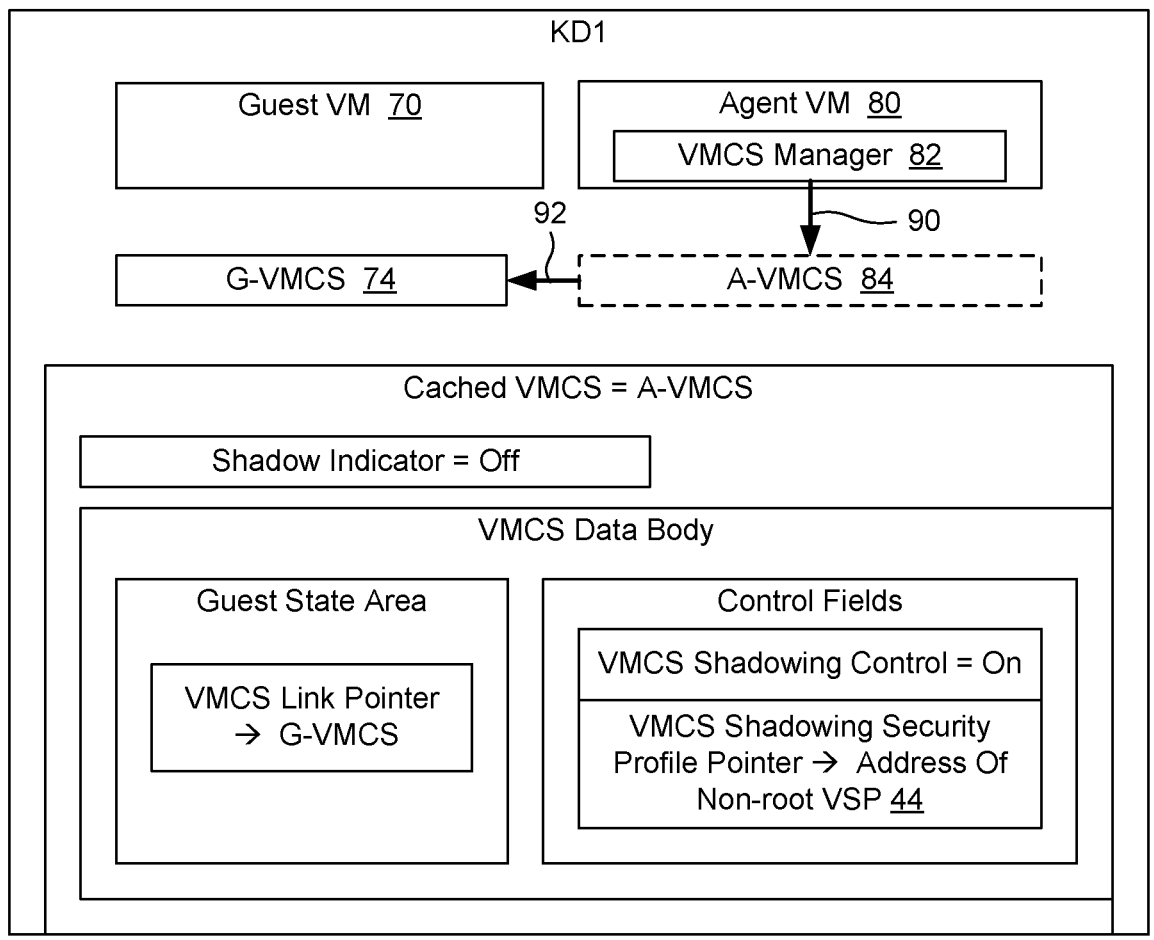
FIG. 5 is a block diagram to illustrate an example configuration of the VM server of FIG. 1 to provide for secure VMCS shadowing.

FIG. 5 is a block diagram to illustrate an example configuration of VM server 14 to provide for secure VMCS shadowing. The configuration in FIG. 5 matches the configuration in FIG. 3. In addition, FIG. 5 illustrates that the depicted components reside in KD1. Also, in FIG. 5, A-VMCS 84 is illustrated with dashed lines to signify that VMCS shadowing is turned on, and as a result, even though A-VMCS 84 is the current VMCS, when agent VM 80 executes a VMREAD or a VMWRITE of the VMCS, processor 22 will redirect that read or write request to G-VMCS 74, as depicted by arrows 90 and 92.

FIGS. 6A through 6D present a flowchart of an example embodiment of a process for securing a VMCS, in the context of distributed data processing system 10. That process may start with VMM 40 running in root mode. As shown at block 102, VMM 40 provides VM client 12 with data to identify the HPAs that VMM 40 will use to load a domain image from VM client 12. For instance, VMM 40 may provide addresses to be used for items such as the following: guest software stack 72 for guest VM 70, G-VMCS 74 for guest VM 70, guest EPT 76 for guest VM 70, VMCS manager 82 for agent VM 80, A-VMCS 84 for agent VM 80, agent EPT 86 for agent VM 80, etc. As shown at block 104, VM client 12 may then prepare domain image 18 accordingly. For instance, with regard to FIG. 2, VM client 12 may prepare content 71 for guest VM 70 and content 81 for agent VM 80, and VM client 12 may the combine that content to create domain image 18. Content 71 may include guest software stack 72 and G-VMCS 74. Content 81 may include VMCS manager 82 and A-VMCS 84. Also, when preparing content 81, VM client 12 may load the address of G-VMCS 74 into the VMCS link pointer field of A-VMCS 84, but VM client 12 may set the other shadowing controls and shadow indicators with values for non-shadow operation of guest VM 70 and agent VM 80, as illustrated in FIG. 2. For instance, VM client 12 may set the shadow indicators for G-VMCS 74 and A-VMCS 84 to Off, etc.

As shown at block 106, VM client 12 may then use its KDK to encrypt domain image 18, and VM client 12 may then send the encrypted domain image 18 to VM server 14. In addition, as indicated above, VM client 12 may also send configuration data to VM server 14. That configuration data may indicate where G-VMCS 74 and A-VMCS 84 should reside within their respective VMs. The configuration data may also include integrity check values (ICVs) for the encrypted domain image 18. The configuration data may also include an encrypted version of the KDK. Also, VM client 12 may send the configuration data to VM server 14 as plaintext, or encrypted in a manner that can be decrypted by VM server outside of KD1.

As shown at blocks 108 and 110, VMM 40 may then receive domain image 18, verify domain image 18, and load domain image 18 into RAM 20 for guest VM 70 and agent VM 80. Domain image 18 may remain encrypted while VMM 40 performs those operations, and VMM 40 may use ICVs received from VM client 12 to verify integrity of the KDK-encrypted domain image 18.

VMM 40 may also provide memory manager 30 with the encrypted KDK for KD1. Memory manager 30 may subsequently decrypt the KDK without making the decrypted version of the KDK visible to any software in VM server 14. Memory manager 30 may subsequently use the decrypted version of the KDK to decrypt the data in KD1, for instance when reading that data from RAM 20 into cache memory 36. However, in other embodiments, other approaches may be used to load the processor in the VM server with a KDK that is not accessible to software in the VM server. For instance, hardware in a VM server may generate the KDK and directly install that KDK into the encryption engine, so the KDK is not accessible to any software, including the VMM. As indicated above, additional details on KDKs and such may be found in the SPC applications and the MET specification.

VMM 40 may then prepare to launch guest VM 70. For instance, as shown at block 112, VMM 40 may use an instruction like VMPTRLD to set the KDK-encrypted G-VMCS 74 as the current VMCS and to request loading of G-VMCS 74 into cache memory 36. In response, memory manager 30 may use the KDK to decrypt G-VMCS 74, and memory manager 30 may then load the decrypted version of G-VMCS 74 into cache memory 36, as shown at block 114. As shown at block 116, VMM 40 may then verify that root VSP 42 provides for suitable VMCS security. For instance, VMM 40 may verify that root VSP 42 allows for reading and writing of Host-state fields, and that root VSP 42 allows for reading of Shared fields.

As shown at block 118, VMM 40 may then verify G-VMCS 74 using VMREAD, and VMM 40 may configure G-VMCS 74 using VMWRITE. For instance, VMM 40 may verify that Shared fields in G-VMCS 74 (e.g., VM exit information) are set correctly and that the shadow indicator is set to Off before the guest VM is launched using G-VMCS 74, and VMM 40 may configure Host-state and Control fields of G-VMCS 74. However, to avoid an error, the verification and configuration operations must abide by the access rights defined in root VSP 42 and the special access rights described above for the shadow indicator. Furthermore, in one embodiment or scenario, root VSP 42 may be configured to disallow all writes in root mode, and VMM 40 may use agent VM 80 to perform any necessary writes to G-VMCS 74 on behalf of VMM 40.

As shown at block 122, after VMM 40 has verified G-VMCS 74 and possibly configured certain fields in G-VMCS 74, VMM 40 may then perform a VM entry to guest VM 70. Accordingly, processing may transition from root mode to non-root mode, and from KD0 to KD1.

As shown at block 124, guest software stack 72 then executes in guest VM 70 in KD1. Eventually there will be a VM exit from guest VM 80, as shown at block 126. Processing may then transition from non-root mode to root mode, and from KD1 to KD0, with control returning to VMM 40.

Figure 6A:
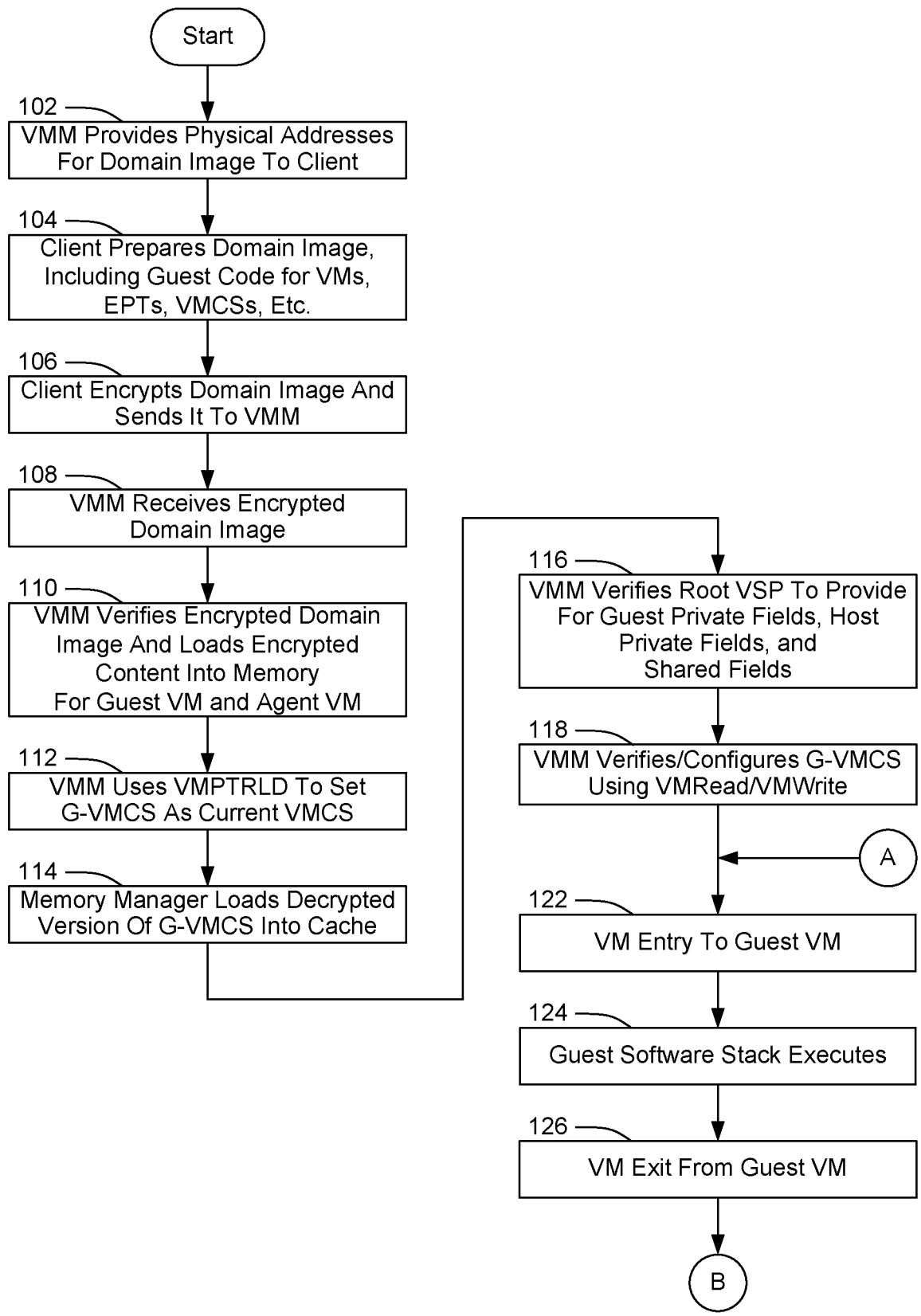
FIGS. 6A through 6D present a flowchart of an example embodiment of a process for securing a VMCS.
Figure 6B:
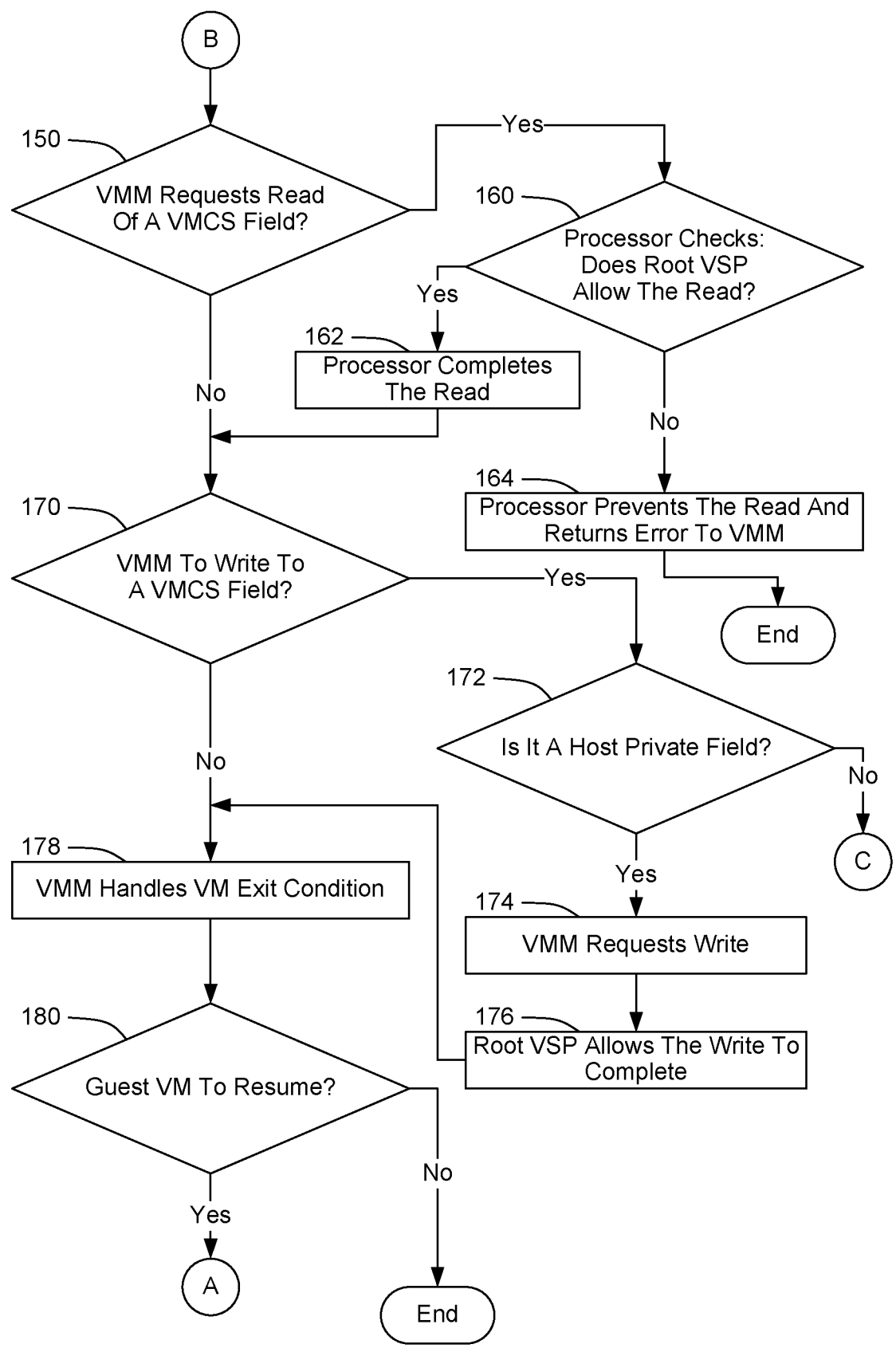

The illustrated process may then pass through page connector B to FIG. 6B. As shown at block 150, processor 22 may then determine whether VMM 40 is trying to execute an instruction to VMREAD a field of the current VMCS (i.e., G-VMCS 74). If that determination is negative, VMM 40 may determine whether G-VMCS 74 should be modified, as shown at block 170. If that determination is negative, VMM 40 may handle the condition that caused the VM exit, as shown at block 178. As shown at block 180, VMM 40 may then determine whether guest VM 70 should resume execution. If VMM 40 determines that guest VM 70 should not resume execution, the illustrated process may end.

However, if guest VM 70 should resume execution, the illustrated process may then return to FIG. 6A via page connector A. VMM 40 may then cause a VM entry to guest VM 70, as shown at block 122. Accordingly, processing may transition again from root mode to non-root mode, and from KD0 to KD1. As shown at block 124, guest VM 70 may then resume execution. Then, as shown at block 126 and indicated above, there will eventually be an exit from guest VM 70. Processing may then continue as indicated above and below.

However, referring again to block 150 of FIG. 6B, if VMM 40 is trying to read the current VMCS, processor 22 may use root VSP 42 to determine whether the read should be allowed, as shown at block 160. For instance, if root VSP 42 is configured as shown in FIG. 4, processor 22 determines that the read should be allowed only if the field has a permission type of Host-private or Shared. If processor 22 determines that the read should be allowed, processor 22 performs the read, as shown at block 162. But if processor 22 determines that the read should not be allowed (e.g., if VMM 40 is trying to read a field with a permission type of Guest-private under the configuration of FIG. 4), processor 22 prevents the read from succeeding, as shown at block 164. Instead, processor 22 returns an error to VMM 40, and the illustrated process may then end.

However, if the read succeeds, or if no read was attempted, VMM 40 may determine whether G-VMCS 74 should be modified, as shown at block 170. If G-VMCS 74 should be modified, VMM 40 may determine whether the field to be modified is a Host-private field, as shown at block 172. If that determination is positive, VMM 40 may proceed with the VMWRITE, and root VSP 42 may allow the write to complete, as shown at blocks 174 and 176. As shown at block 178, VMM 40 may then take any other steps necessary to handle the VM exit condition. As shown at block 180, VMM 40 may then determine whether guest VM 70 should resume execution. If so, the illustrated process may then return to FIG. 6A via page connector A. VMM 40 may then cause a VM entry to guest VM 70, as shown at block 122, and processing may continue as indicated above.

Figure 6C:
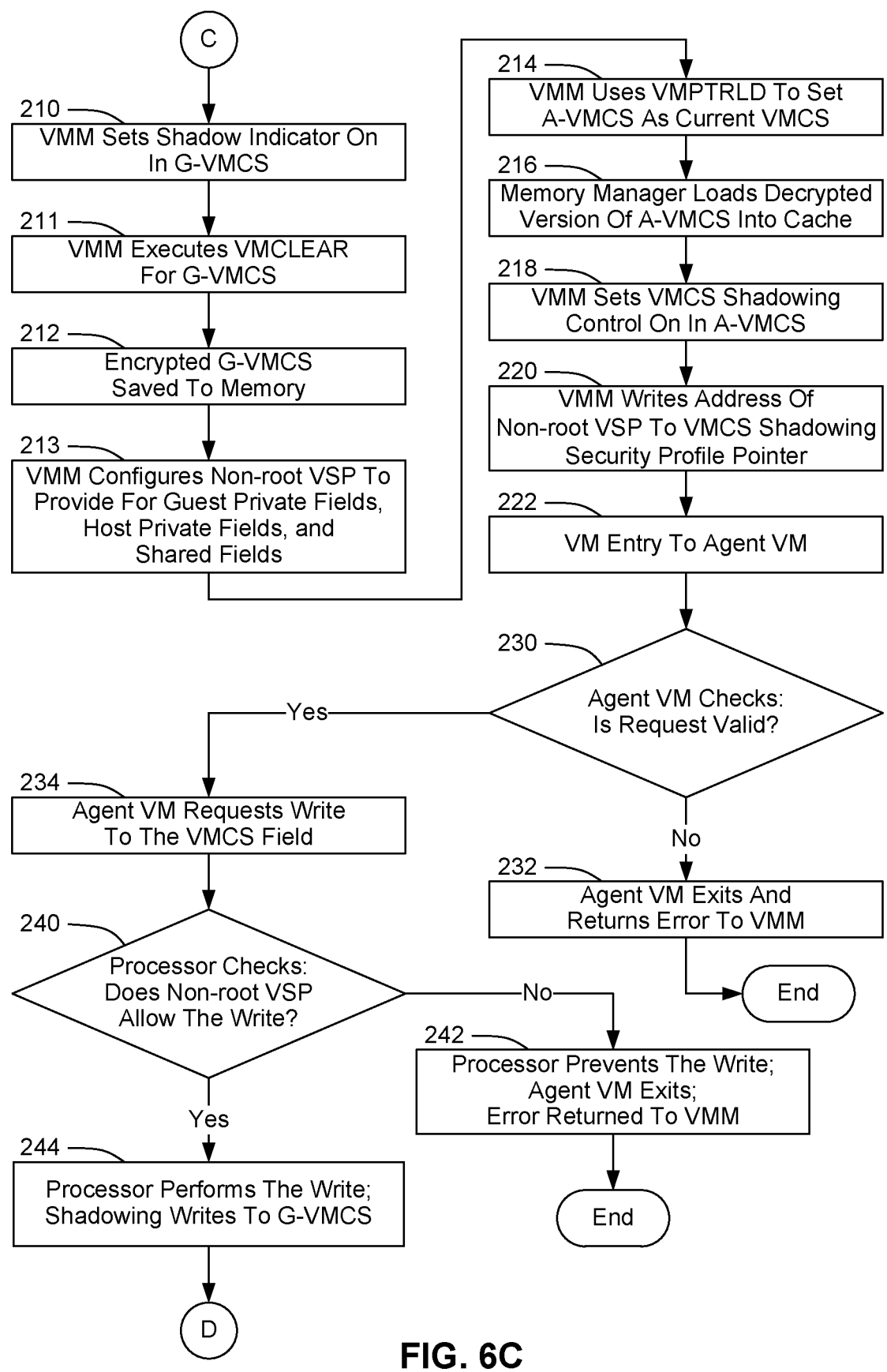
Figure 6D:
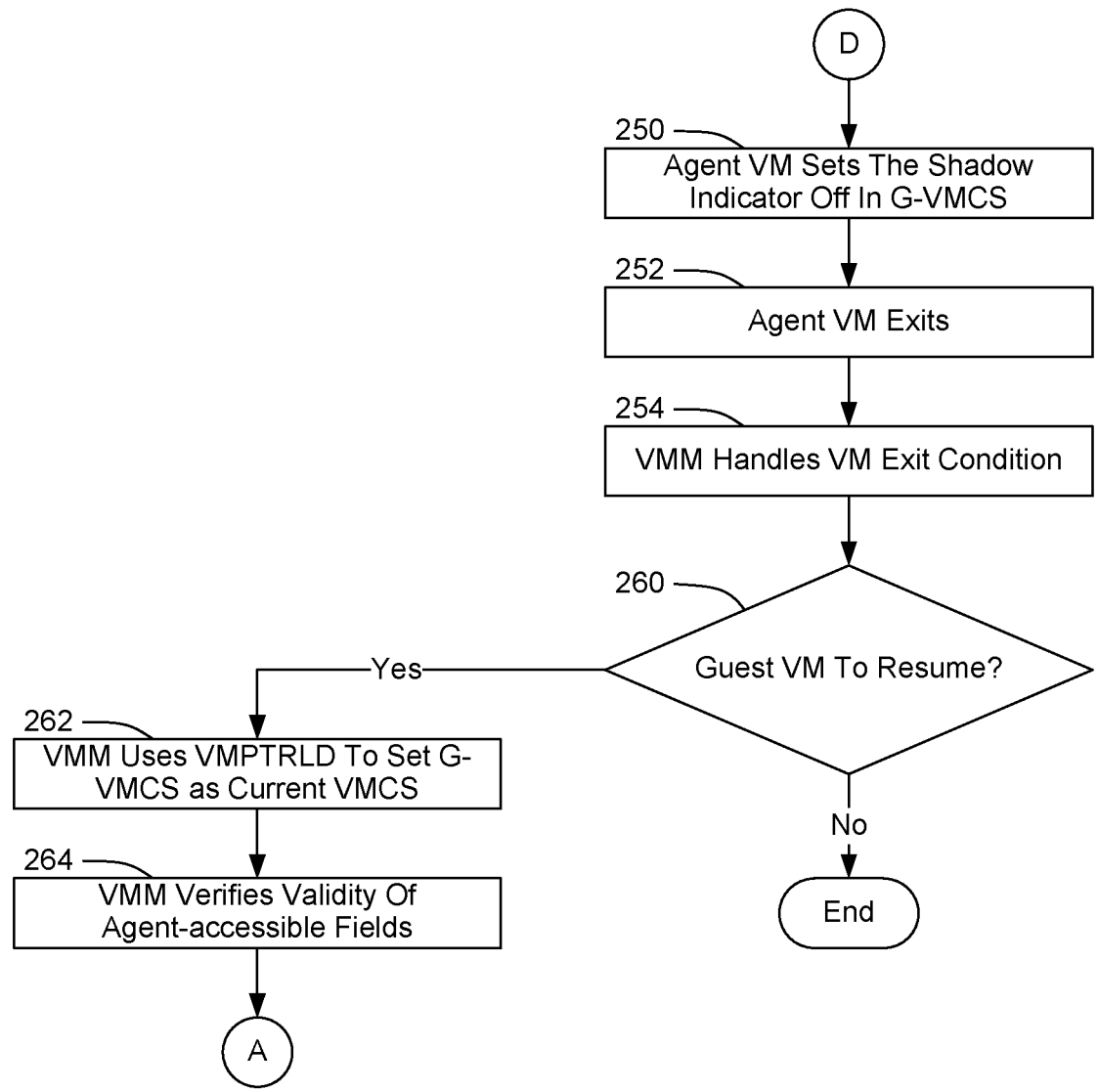

However, referring again to block 172 of FIG. 6B, if VMM 40 intends to modify a field that is not a Host-private filed (i.e., a Guest-private field or a Shared-private field), the illustrated process may pass through page connector C to FIG. 6C, and VMM 40 may update G-VMCS 74 with the help of VMCS manager 82 in agent VM 80.

In particular, as shown at block 210 of FIG. 6C, before changing the current VMCS, VMM 40 sets the shadow indicator On in G-VMCS 74. Processor 22 allows that write, due to the special rules for the shadow indicator described above.

As shown at block 211, VMM 40 then executes a VMCLEAR for G-VMCS 74. That VMCLEAR evicts G-VMCS 74 from cache memory and causes memory manager 30 to use the KDK for KD1 to encrypt G-VMCS 74. As shown at block 212, memory manager 30 then saves the KDK-encrypted G-VMCS 74 to RAM 20.

As shown at block 213, VMM 40 also verifies and, if necessary, updates non-root VSP 44 to provide proper access rights for Guest-private fields, Host-private fields, and Shared fields as illustrated in FIG. 4.

As shown at block 214, VMM 40 then uses VMPTRLD to load and set A-VMCS 84 as the current VMCS. Consequently, as shown at block 216, memory manager 30 decrypts A-VMCS 84 and loads the decrypted A-VMCS 84 into cache memory 36. Then, as shown at block 218, VMM 40 sets VS control 65 to On, using VMWRITE. As shown at block 220, VMM 40 also writes the address of non-root VSP 44 to VSSP pointer 66. And the updates from blocks 218 and 220 will be allowed to succeed by root VSP 42, since VS control 65 and VSSP pointer 66 are Control fields. Also, VMM 40 may configure fields in A-VMCS 84 like VS control 65 and VSSP pointer 66 once after VM server 14 receives domain image 18, and VMM 40 may skip those operations in subsequent iterations of the process depicted in FIG. 6C.

VMM 40 may also create a write request to specify the VMCS field(s) that agent VMCS manager 82 is supposed to update for VMM 40, and the value(s) to be written to that field. For instance, a write request may include multiple different values to be written to multiple different fields of the VMCS. Such fields may include, for instance, one or more Shared fields, one or more MSR fields, and/or an EPT data structure. To further indicate what is to be edited in the VMCS, VMM 40 may use metadata to identify the field information, as indicated in the SDM for VMCS component encoding. In addition, the VMCS field encodings may be extended to include additional context by using existing reserved bits in the encoding structures.

As shown at block 222, VMM 40 then executes a VM entry to launch or resume agent VM 80. Consequently, execution transitions from root mode to non-root mode and from and from KD0 to KD1.

As shown at block 230, VMCS manager 82 in agent VM 80 then checks the write request from VMM 40 to determine whether the request is valid. For instance, VMCS manager 82 may include rules defining allowed and disallowed updates, and VMCS manager 82 may use those rules to determine whether the write request includes any disallowed updates. As shown at block 232, if the write request is not valid, agent VM 80 may exit without completing the request and return an error to VMM 40, and the illustrated process may then end.

However, if the write request is valid, VMCS manager 82 in agent VM 80 may then use VMWRITE to update the requested VMCS field with the requested value. As shown at block 240, processor 22 may then use non-root VSP 44 to determine whether the write should be allowed. For instance, if non-root VSP 44 is configured as shown in FIG. 4, processor 22 determines that the write should be allowed only if the field has a permission type of Guest-private or Shared. If processor 22 determines that the write should not be allowed, instead of performing the write, processor 22 may cause agent VM 80 to exit, and processor 22 may return an error to VMM 40, as shown at block 242. The illustrated process may then end.

However, if non-root VSP 44 does not disallow the write, processor 22 performs the write, and shadowing causes the write to be applied to G-VMCS 74 in RAM, as shown at block 244. The illustrated process may then proceed to FIG. 6D via page connector D.

As shown at block 250, VMCS manager 82 in agent VM 80 may then set the shadow indicator in G-VMCS 74 to Off, so that VMM 40 may subsequently use G-VMCS 74 to launch guest VM 70. As shown at block 252, agent VM 80 may then exit. As shown at block 254, VMM 40 may then take any other steps necessary to handle the VM exit condition.

As shown at block 260, VMM 40 may then determine whether guest VM 70 should resume execution. If not, the illustrated process may end. However, if guest VM 70 should resume execution, VMM 40 may use VMPTRLD to load and set G-VMCS 74 as the current VMCS, as shown at block 262. This operation also turns off shadowing, since VS control 65 in G-VMCS 74 is set to Off.

As shown at block 264, VMM 40 may then verify the validity of the fields that were write-accessible to agent VM 80 via VMWRITE, to make sure that agent VM 80 did not write any unauthorized data to G-VMCS 74. For instance, VMM 40 may make sure that agent VM 80 did not modify any VM-exit information. The illustrated process may then return to FIG. 6A via page connector A.

As shown at block 122, VMM 40 may then execute a VM entry to guest VM 70. Processing may then continue as indicated above.

Thus, as has been described, an agent VM may modify a VMCS. In addition, an agent VM have exclusive access to modify other structures in the VM's private memory, such as the EPT and related structures. According to one embodiment, VMREAD is extended to allow the VMM to read the EPT in a VM's encrypted memory space, using the VM's private KeyID. Thus, VMREAD enables the VMM to verify any modification the agent VM may have made to the EPT structures.

Figure 7:
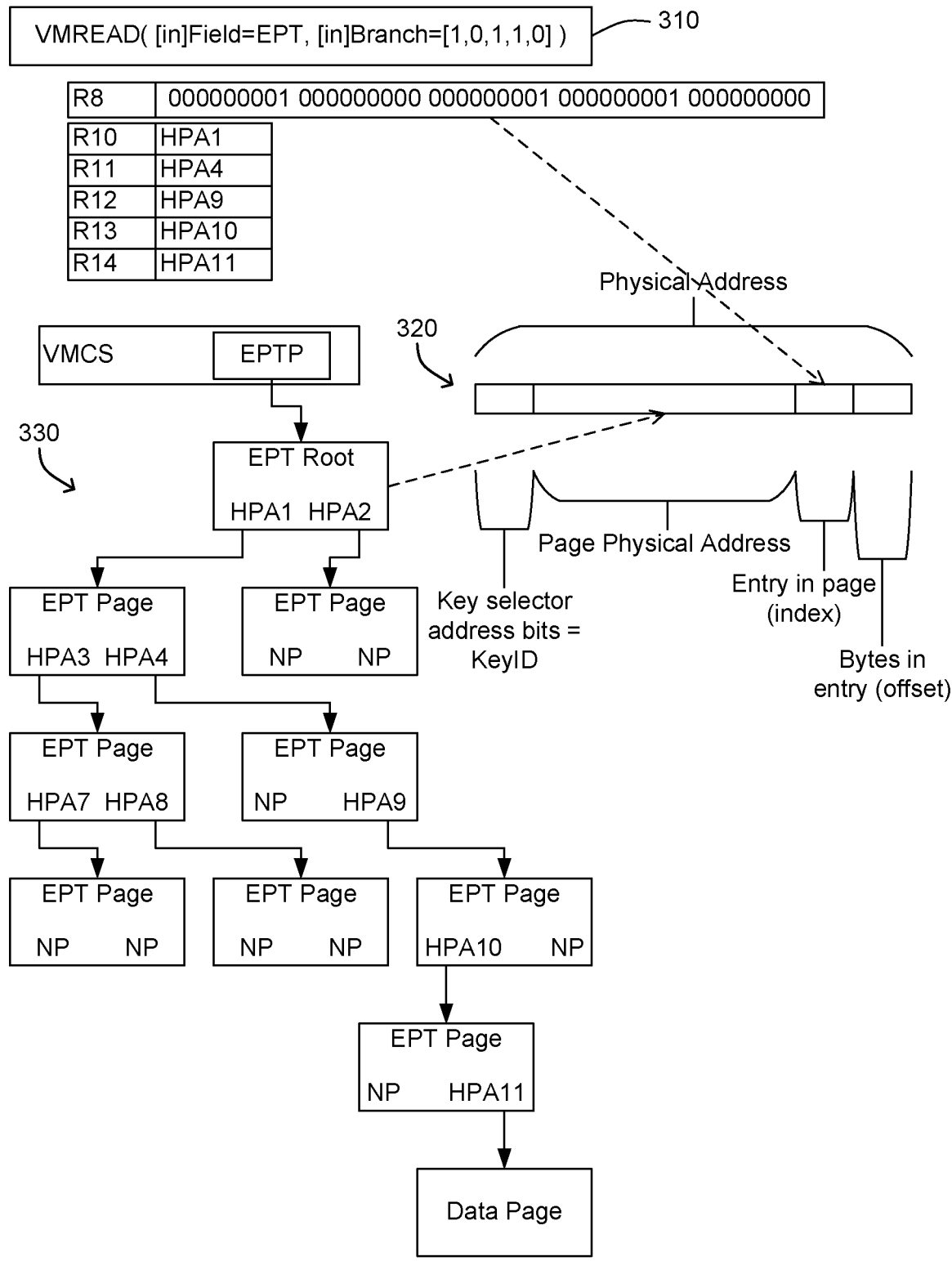
FIG. 7 is a block diagram depicting various structures used by a VMM to verify an extended page table.

FIG. 7 is a block diagram depicting various structures used by a VMM to verify an EPT. In particular, FIG. 7 illustrates an example VMREAD instruction 310 for reading EPT data. FIG. 7 also illustrates an example EPT 330 and an example physical address 320, along with an example set of registers 340 to facilitate the reading of EPT data. As described in greater detail below, a VMM may use VMREAD instruction 310 and registers 340 to read and verify one, some or all branches in EPT 330.

In the embodiment of FIG. 7, EPT 330 includes an EPT root page and zero or more additional pages. Each page includes 512 entries. Each entry occupies 64 bits, and the data in each entry may point to another page in the EPT, may point to a page of user data (i.e., a data page) for the VM, or may be a null pointer (NP). All of the entries in a chain that points ultimately to a data page may be referred to as a branch. The relative position of an entry within a page may be referred to as an index.

In the embodiment of FIG. 7, as illustrated by physical address 320, each physical address used by memory manager 30 to read from RAM 20 includes (a) a set of key selector address bits, to be loaded with a KeyID to allow data to be read and decrypted from the associated KD; (b) the physical address of a desired page; (c) an index to identify a desired entry within the 512 entries in the desired page; and (d) an offset to indicate how many valid bytes are in the desired entry.

In the embodiment of FIG. 7, VMREAD instruction 310 includes (a) a first input ("[in]") parameter to indicate that a branch of the EPT is to be read and (b) a second [in] parameter to specify the indexes for the entries of the EPT that are to be read as part of that branch. The first parameter (to indicate that the EPT is to be read) may be encoded as an additional field, and the second parameter may specify a general-purpose register (GPR) (e.g., R8) that contains the indexes to specify the branch in the EPT tree that is to be read. Accordingly, that GPR may be referred to as the branch GPR. And in FIG. 7, the values shown as part of the second parameter represent the indexes specified by the branch GPR. As described in greater detail below, when a VMREAD for the EPT field is received by the processor in root mode, the processor will use the EPTP in the current VMCS, the indexes specified in the branch register, the EPT entries that are referenced by those indexes, and the VM's KeyID to read physical addresses from the EPT for verification.

In the embodiment of FIG. 7, there are 512 page-table entries in each page of EPT 330, with 8 bytes or 64 bits per entry. Consequently, 9 bits are needed to select an entry from each level of the EPT. Assuming there are 5 defined EPT levels (embodiments may have more or less), 45 bits in the branch GPR can be used to specify an entire branch. In particular, as illustrated with R8 in FIG. 7, the encoding for the branch GPR is to use the first 9 bits to specify the index for the desired entry in the first level of the EPT, followed in the next 9 bits with the index for the desired entry in the relevant page in the second-level of the EPT (i.e., the page referenced by the first entry), and so on until the specified level is reached. If the branch GPR holds more than 45 bits (e.g., 64 bits), any remaining (unused) bits may be reserved. The processor may also write the contents of the selected entry at each level of the EPT to other GPRs (e.g., R10-R14), with one 64-bit GPR per each 64-bit page table entry (or zero if the parent entry is invalid or not present).

In particular, to being verifying a particular branch of the EPT, the processor will read the branch GPR (e.g., R8), and the processor will access the EPT root page referenced by the current VMCS's EPTP, appending the VM's private KeyID to the physical address. The processor will then use the first 9 bits of the branch GPR to determine which entry to select from the EPT root page. (That entry may be referred to as the first EPT entry.) The processor will then write the 64-bit contents of the first EPT entry into R10. If the first EPT entry is present and its contents are a valid HPA, the processor will use that HPA to determine the location of the next (second-level) EPT page in memory for the branch.

The processor will then access this second-level page, appending the VM's private KeyID to the physical address. The processor will then use the second set of 9 bits of the branch GPR to determine which entry to select from the second-level page. The processor will then write the contents of this second EPT entry into R11. If the second EPT entry is present and its contents are a valid HPA, the processor will then use that HPA to determine the location of the third-level EPT page for the branch.

The processor will then access the entry on that third-level EPT page, appending the KeyID to the physical memory address. The processor will then use the third set of nine bits of the branch GPR to determine which entry to select from the third-level page. The processor will then write the contents of that third EPT Entry into R12. If the third EPT entry is present and its contents are a valid HPA, the processor will then use that HPA to determine the location of the fourth-level EPT page for the branch.

The processor may continue in the same manner, until it reaches either a not present, an invalid, or a leaf EPT entry, at which point the remaining GPRs (e.g., R13 or R14) will be set to zero. By modifying the contents of the branch GPR and repeating the above process, the VMM may read and verify every branch in the EPT.

In other embodiments the processor may read an entire EPT page referenced by the branch GPR into a shared memory location (e.g., by reading with the VM's private KeyID and then writing back to memory using the VMM's KeyID). Such functionality may be provided by a VMREAD instruction with a parameter(s) for specifying one or more destination memory locations to receive the data from one or more EPT pages. However, to maintain security, only the contents if the VM's EPT will ever be exposed to the VMM, not the contents of the actual data and code pages belonging to the VM.

Processor 22 includes control logic to perform operations like (a) determining which KeyID to use when reading the EPT or other data in a KD and (b) preventing any data pages for a VM from being exposed to a VMM. Such control logic is depicted in FIG. 1 as KC 46.

As has been described, a VM server may include technology which provides for secure VMCS manipulation. For instance, that technology may prevent guest VMs and agent VMs from accessing Host-private fields, while allowing guest VMs and agent VMs to access Guest-private fields and Shared fields. The technology may also prevent VMMs from accessing Guest-private fields. However, the technology may allow a VMM to use an agent VM to update Guest-private fields and Shared fields on behalf of the VMM. The technology may also protect other fields in the VMCS, such as the EPTP, as well as the associated EPT tree hierarchies, MSRs, etc.

Although certain example embodiments are described herein, one of ordinary skill in the art will understand that those example embodiments may easily be divided, combined, or otherwise altered to implement additional embodiments. Likewise, expressions such as "an embodiment," "one embodiment," and "another embodiment" are meant to generally reference embodiment possibilities. Those expressions are not intended to limit the invention to particular embodiment configurations. As used herein, those expressions may reference the same embodiment or different embodiments, and those embodiments are combinable into other embodiments. In light of the principles and example embodiments described and illustrated herein, it will be recognized that the illustrated embodiments can be modified in arrangement and detail without departing from such principles.

Also, embodiments have been described herein with regard to certain instruction names, field names, values, etc. Those particular names and values may typically be used in association with one or more particular types or brands of processors. However, other kinds of processors may support the same kinds of features, even though the manufacturers of those processors may use different terminology. Accordingly, for purposes of this disclosure, terms like VMREAD, VMWRITE, VMX operation, root mode, non-root mode, etc., should be understood as encompassing the salient features described herein, rather than as being limited to products from a particular manufacturer. For instance, in general, VMCS should be understood as denoting a data structure, or combination of data structures, with data (e.g., guest state data and host state data) for managing a VM. A VMCS may also be referred to as a virtual machine control block (VMCB), a virtual machine control data structure (VMCDS), etc. Similarly, VMREAD and VMWRITE should be understood as denoting instructions that enable software to read and write a VMCDS. A VMREAD instruction may also be referred to using terms such as VMCSRead, VRead, etc. Likewise, a VMWRITE instruction may also be referred to as VMCSWrite, VWrite, etc. Also, EPT should be understood as denoting a data structure, or combination of data structures, with data for translating a virtual memory address into a physical memory address. An EPT may also be referred to using terms such as second level address translation (SLAT) table, nested page table (NPT), rapid virtualization indexing (RVI) table, etc. Also, different embodiments may use different specific values to denote settings such as on and off, read-allowed, write-allowed, etc.

For instance, a value of 0 in a particular data structure may be used to indicate that read is allowed, and a value of 1 may be used to indicate that read is not allowed. Also, for purposes of this disclosure, the different parts of a processor which enable the processor to perform the operations described herein with regard to virtualization may be referred to in general as virtualization technology. Thus, virtualization technology includes, without limitation, the instruction decoder that recognizes and dispatches instructions pertaining to virtualization (e.g., VMPTRLD, VRead, VWrite, etc.), as well as the control logic that the processor uses to execute such instructions. The control logic to which an instruction decoder dispatches an instruction for execution may be referred to as an execution unit.

As described above, a device may include instructions and other data which, when accessed by a processor, cause the device to perform particular operations. For purposes of this disclosure, instructions which cause a device to perform operations may be referred to in general as software. Software and the like may also be referred to as control logic. Software that is used during a boot process may be referred to as firmware. Software that is stored in nonvolatile memory may also be referred to as firmware. Software may be organized using any suitable structure or combination of structures. Accordingly, terms like program and module may be used in general to cover a broad range of software constructs, including without limitation application programs, subprograms, routines, functions, procedures, drivers, libraries, data structures, processes, microcode, and other types of software components. Also, it should be understood that a software module may include more than one component, and those components may cooperate to complete the operations of the module. Also, the operations which the software causes a device to perform may include creating an operating context, instantiating a particular data structure, etc. Any suitable operating environment and programming language (or combination of operating environments and programming languages) may be used to implement software components described herein.

A medium which contains data and which allows another component to obtain that data may be referred to as a machine-accessible medium or a machine-readable medium. In one embodiment, software for multiple components is stored in one machine-readable medium. In other embodiments, two or more machine-readable media may be used to store the software for one or more components. For instance, instructions for one component may be stored in one medium, and instructions another component may be stored in another medium. Or a portion of the instructions for one component may be stored in one medium, and the rest of the instructions for that component (as well instructions for other components), may be stored in one or more other media. Similarly, software that is described above as residing on a particular device in one embodiment may, in other embodiments, reside on one or more other devices. For instance, in a distributed environment, some software may be stored locally, and some may be stored remotely. Similarly, operations that are described above as being performed on one particular device in one embodiment may, in other embodiments, be performed by one or more other devices.

Accordingly, alternative embodiments include machine-readable media containing instructions for performing the operations described herein. Such media may be referred to in general as apparatus and in particular as program products. Such media may include, without limitation, tangible non-transitory storage components such as magnetic disks, optical disks, RAM, read-only memory (ROM), etc., as well as processors, controllers, and other components that include data storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. In some embodiments, some or all of the control logic for implementing the described operations may be implemented in hardware logic (e.g., as microcode in an integrated circuit chip, as a programmable gate array (PGA), as an application-specific integrated circuit (ASIC), etc.).

Additionally, the present teachings may be used to advantage in many different kinds of data processing systems. Such data processing systems may include, without limitation, accelerators, systems on a chip (SOCs), wearable devices, handheld devices, smartphones, telephones, entertainment devices such as audio devices, video devices, audio/video devices (e.g., televisions and set-top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. A data processing system may also be referred to as an apparatus. The components of a data processing system may also be referred to as apparatus.

Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Similarly, terms such as "line," "pin," etc. should be understood as referring to a wire, a set of wires, or any other suitable conductor or set of conductors. For instance, a bus may include one or more serial links, a serial link may include one or more lanes, a lane may be composed of one or more differential signaling pairs, and the changing characteristics of the electricity that those conductors are carrying may be referred to as signals on a line. Also, for purpose of this disclosure, the term "processor" denotes a hardware component that is capable of executing software. For instance, a processor may be implemented as a central processing unit (CPU), a processing core, or as any other suitable type of processing element. A CPU may include one or more processing cores, and a device may include one or more CPUs.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

What is claimed is:

1. A processor with technology to secure a virtual machine control data structure, the processor comprising:
    virtualization technology that enables the processor to:
        execute host software in root mode; and
        execute guest software in non-root mode in a virtual machine (VM), wherein the VM is based at least in part on a virtual machine control data structure (VMCDS) for the VM; and
    a root security profile that specifies access restrictions to be imposed when the host software attempts to read the VMCDS in root mode.

2. A processor according to claim 1, wherein the root security profile provides for a first access restriction for a first part of the VMCDS and a second access restriction for a second part of the VMCDS.

3. A processor according to claim 1, wherein the access restrictions in the root security profile disallow reading of a guest state area of the VMCDS in root mode.

4. A processor according to claim 1, further comprising:
    security control logic to:
        allow the host software in root mode to read a second-level address translation (SLAT) table for the VM; and
        prevent the host software in root mode from reading user data for the VM.

5. A processor according to claim 1, further comprising:
    an instruction decoder that recognizes a VMCDS read (VRead) instruction that identifies part of the VMCDS; and
    wherein processor is configured to process a given VRead instruction from the host software by returning an error if the root security profile indicates that the identified part of the VMCDS is not allowed to be read in root mode.

6. A processor according to claim 1, further comprising:
    a key-identifier (KeyID) controller to enable the processor to establish a key domain (KD) for the guest software, wherein the KD comprises an area of random access memory (RAM) that a memory manager protects by encrypting data with a key domain key (KDK) before storing that data to that area of RAM.

7. A processor according to claim 6, wherein the KeyID controller enables the data processing system to:
store the VMCDS for the VM in the KD;
launch the VM in the KD; and
execute the host software outside of the KD.

8. A processor according to claim 6, wherein the KeyID controller comprises security control logic to:
allow the host software in root mode to read a second-level address translation (SLAT) table for the VM from the KD; and
prevent the host software in root mode from reading user data for the VM from the KD.

9. A data processing system with technology to secure a virtual machine control data structure, the data processing system comprising:
random access memory (RAM);
a processor in communication with the RAM;
virtualization technology in the processor that enables the processor to:
execute host software in root mode; and
execute guest software from the RAM in non-root mode in a virtual machine (VM), wherein the VM is based at least in part on a virtual machine control data structure (VMCDS) for the VM; and
a root security profile in the processor to specify access restrictions to be imposed when the host software attempts to read the VMCDS in root mode.

10. A data processing system according to claim 9, further comprising:
a memory manager in communication with the RAM; and
an encryption engine in the memory manager, wherein the encryption engine enables the processor to establish a key domain (KD) for the guest software, wherein the KD comprises an area of RAM that the memory manager protects by encrypting data with a key domain key (KDK) before storing that data to that area of RAM.

11. A data processing system according to claim 10, wherein the data processing system does not allow the host software to access the KDK.

12. A data processing system according to claim 10, wherein the processor enables the data processing system to:
store the VMCDS for the VM in the KD;
launch the VM in the KD; and
execute the host software outside of the KD.

13. A data processing system according to claim 10, further comprising security control logic in the processor to:
allow the host software in root mode to read a second-level address translation (SLAT) table for the VM from the KD; and
prevent the host software in root mode from reading user data for the VM from the KD.

14. A data processing system according to claim 13, wherein the security control logic allows the processor is to use a key identifier (KeyID) for the KDK when the host software reads the SLAT table for the VM from the KD.

15. A data processing system according to claim 9, wherein the root security profile provides for a first access restriction for a first part of the VMCDS and a second access restriction for a second part of the VMCDS.

16. A data processing system according to claim 9, wherein the access restrictions in the root security profile disallow reading of a guest state area of the VMCDS in root mode.

17. A method for securing a virtual machine control data structure in a data processing system, the method comprising:
establishing a key domain (KD) in random access memory (RAM) of a data processing;
loading a virtual machine control data structure (VMCDS) for a virtual machine (VM) into the KD;
executing guest software in the VM in the KD in non-root mode;
receiving a request from a virtual machine monitor (VMM) executing in root mode in the data processing system, wherein the request involves accessing the VMCDS;
in response to receiving the request from the VMM in root mode, automatically using a root security profile to determine whether or not to allow the VMM to access the VMCDS.

18. A method according to claim 17, wherein the VM comprises a guest VM, the method further comprising:
determining, at the VMM, that the VMCDS for the guest VM should be modified; and
in response to determining, at the VMM, that the VMCDS for the guest VM should be modified, automatically using an agent VM that executes in the KD to write to the VMCDS for the guest VM, on behalf of the VMM.

19. A method according to claim 18, further comprising:
automatically using a non-root security profile to determine whether or not to allow the agent VM to write to the VMCDS.

20. A method according to claim 19, further comprising:
using a key identifier (KeyID) for the KD to allow the VMM to read a second-level address translation (SLAT) table for the VM from the KD.

* * * * *